United States Patent
Snead et al.

(10) Patent No.: US 9,815,717 B2
(45) Date of Patent: Nov. 14, 2017

(54) DEPRESSANTS FOR USE IN SEPARATION PROCESSES

(71) Applicant: Georgia-Pacific Chemicals LLC, Atlanta, GA (US)

(72) Inventors: David R. Snead, Atlanta, GA (US); Clay E. Ringold, Decatur, GA (US); Brian L. Swift, Oxford, GA (US)

(73) Assignee: Georgia-Pacific Chemicals LLC, Atlanta, GA (US)

( * ) Notice: Subject to any disclaimer, the term of this patent is extended or adjusted under 35 U.S.C. 154(b) by 527 days.

(21) Appl. No.: 14/534,764

(22) Filed: Nov. 6, 2014

(65) Prior Publication Data

US 2015/0129506 A1 May 14, 2015

Related U.S. Application Data

(60) Provisional application No. 61/901,475, filed on Nov. 8, 2013.

(51) Int. Cl.

| | |
|---|---|
| *B01D 21/01* | (2006.01) |
| *C02F 1/52* | (2006.01) |
| *B03D 3/00* | (2006.01) |
| *B01J 20/26* | (2006.01) |
| *C22B 3/00* | (2006.01) |
| *B03D 1/001* | (2006.01) |
| *B03D 3/06* | (2006.01) |
| *B03D 1/004* | (2006.01) |
| *B03D 1/01* | (2006.01) |
| *C02F 1/56* | (2006.01) |
| *B01D 15/00* | (2006.01) |
| *B01D 37/00* | (2006.01) |
| *B03D 1/14* | (2006.01) |
| *C02F 1/24* | (2006.01) |
| *C02F 101/10* | (2006.01) |
| *C02F 1/00* | (2006.01) |

(52) U.S. Cl.
CPC ............ *C02F 1/5272* (2013.01); *B03D 1/004* (2013.01); *B03D 1/01* (2013.01); *B03D 3/06* (2013.01); *C02F 1/56* (2013.01); *B01J 20/26* (2013.01); *C02F 1/24* (2013.01); *C02F 2001/007* (2013.01); *C02F 2101/10* (2013.01); *C02F 2101/105* (2013.01); *C22B 3/00* (2013.01)

(58) Field of Classification Search
USPC ......................................... 521/25, 27, 30, 34
See application file for complete search history.

(56) References Cited

U.S. PATENT DOCUMENTS

| | | | |
|---|---|---|---|
| 2,926,116 A | 2/1960 | Keim | |
| 2,926,154 A * | 2/1960 | Keim ................... | C08G 69/48 162/164.3 |
| 4,545,898 A * | 10/1985 | Hellsten ............... | B03D 1/008 209/166 |
| 7,781,501 B2 | 8/2010 | Dopico et al. | |
| 8,127,930 B2 | 3/2012 | Wright et al. | |
| 8,425,781 B2 | 4/2013 | Hines et al. | |
| 8,875,898 B2 | 11/2014 | Hines et al. | |
| 8,925,729 B2 | 1/2015 | Hines et al. | |
| 2010/0294725 A1 * | 11/2010 | Bush .................... | C02F 1/5272 210/702 |

FOREIGN PATENT DOCUMENTS

| | | |
|---|---|---|
| WO | 2009/005978 | 1/2009 |
| WO | 2009/052362 | 4/2009 |

OTHER PUBLICATIONS

Maurer et al. (Competitive Adsorption of Poly(1-vinylpyrrolidone-co-styrene) and Kymene 557H® onto Wood Fibers: The Improved Effect of Sequential Adsorption, Masters Thesis, Georgia Institute of Technology, 2006, Chapter 3, p. 30).*
International Search Report and Written Opinion of WO 2009/052362, dated Apr. 19, 2010.
International Search Report and Written Opinion of WO 2009/005978, dated Dec. 29, 2009.

* cited by examiner

*Primary Examiner* — Clare M Perrin
(74) *Attorney, Agent, or Firm* — Ram W. Sabnis

(57) ABSTRACT

Methods for removing particulates from an aqueous suspension are provided. In at least one specific embodiment, the method can include mixing a polyamidoamine-epihalohydrin resin with an aqueous suspension comprising one or more first particulates to produce a treated mixture. An amount of the polyamidoamine-epihalohydrin resin in the treated mixture can be less than 500 g/tonne of the one or more first particulates. The method can also include recovering from the treated mixture a purified water having a reduced concentration of the one or more first particulates relative to the aqueous suspension, a purified first particulate product having a reduced concentration of water relative to the aqueous suspension, or both.

20 Claims, No Drawings

DEPRESSANTS FOR USE IN SEPARATION PROCESSES

CROSS-REFERENCE TO RELATED APPLICATION

This application claims priority to U.S. Provisional Patent Application having Ser. No. 61/901,475, filed on Nov. 8, 2013, which is incorporated by reference herein.

BACKGROUND

Field

Embodiments described generally relate methods for separating particulates from aqueous suspensions with depressants. More particularly, such embodiments relate to methods for separating particulates from aqueous suspensions with depressants that include one or more polyamidoamine-epihalohydrin resins.

Description of the Related Art

Flotation, coagulation, flocculation, filtration, and sedimentation are widely used separation processes for the beneficiation of ores and other solids present as a component in a liquid suspension, dispersion, solution, slurry, or other mixture that includes particulates and a liquid. Adjuvants are often incorporated into the mixture to improve the selectivity of the process. For example, "collectors" can be used to chemically or physically adhere to solid particles and render the particles more hydrophobic and more likely to float. On the other hand, "depressants" can be used to chemically or physically adhere to solid particles and render the particles more hydrophilic and more likely to sink. In this manner, mixtures that include two (or more) different types of particulate material in a liquid can be separated by causing some material to float and other material to sink. For example, an aqueous suspension of kaolin clay, a material having a number of industrially significant applications, and iron and titanium oxides as impurities can be beneficiated by flotation of the impurities leaving a purified kaolin clay as a bottoms product.

The nature of both the desired and the unwanted components varies greatly in separation processes, which can be due, at least in part, to the differences in chemical composition of the materials, the types of any prior chemical treatment, and various processing steps used in generating the mixture, among other factors. Consequently, the number and types of depressants is correspondingly large. Various depressants are known in the art and include guar gum, sodium silicate, starch, tannins, dextrins, lignosulphonic acids, carboxymethyl cellulose, cyanide salts, and others. Despite the large offering of depressants known in the art, an adequate degree of refinement in many cases remains difficult to achieve.

There is a need, therefore, for improved depressants for use in separating particulates from aqueous suspensions.

SUMMARY

Methods for removing particulates from an aqueous suspension are provided. In at least one specific embodiment, the method can include mixing a polyamidoamine-epihalohydrin resin with an aqueous suspension comprising one or more first particulates to produce a treated mixture. An amount of the polyamidoamine-epihalohydrin resin in the treated mixture can be less than 500 g/tonne of the one or more first particulates. The method can also include recovering from the treated mixture a purified water having a reduced concentration of the one or more first particulates relative to the aqueous suspension, a purified first particulate product having a reduced concentration of water relative to the aqueous suspension, or both.

In another specific embodiment, the method for separating particulates from an aqueous suspension can include mixing a polyamidoamine-epihalohydrin resin with an aqueous suspension comprising one or more particulates to produce a treated mixture. An amount of the polyamidoamine-epihalohydrin resin in the treated mixture can be less than 500 g/tonne of the one or more particulates. The method can also include removing water from the treated mixture by drainage, filtration, sedimentation, mechanical compression, or any combination thereof to produce a purified water having a reduced concentration of the one or more particulates relative to the aqueous suspension.

In another specific embodiment, the method for separating particulates from an aqueous suspension can include dispersing a polyamidoamine-epihalohydrin resin in an aqueous suspension comprising one or more first particulates and one or more second particulates to produce a treated mixture. An amount of the polyamidoamine-epihalohydrin resin in the treated mixture can be less than 500 g/tonne of the one or more first particulates and the one or more second particulates. The method can also include passing air through the treated mixture to produce a relatively hydrophobic fraction and a relatively hydrophilic fraction. The method can also include collecting a purified product that includes the one or more first particulates having a reduced concentration of the one or more second particulates relative to the aqueous slurry from either fraction.

DETAILED DESCRIPTION

It has been has been surprisingly and unexpectedly discovered that a low dosage amount of one or more polyamidoamine-epihalohydrin resins ("PAE resins") can be used as a depressant in the purification of an aqueous suspension, dispersion, solution, slurry, or other liquid mixture containing particulates. For example, the amount of the PAE resin added to the aqueous suspension can be less than 500 g/tonne of the particulates in the aqueous suspension or simply "g/tonne of the particulates," less than 400 g/tonne of the particulates, less than 300 g/tonne of the particulates, less than 200 g/tonne of the particulates, less than 100 g/tonne of the particulates, less than 75 g/tonne of the particulates, less than 50 g/tonne of the particulates, less than 20 g/tonne of the particulates, less than 16 g/tonne of the particulates, less than 14 g/tonne of the particulates, less than 12 g/tonne of the particulates, less than 10 g/tonne of the particulates, less than 8 g/tonne of the particulates, or less than 6 g/tonne of the particulates, less than 4 g/tonne of the particulates, or less than 2 g/tonne of the particulates. In another example, the amount of the PAE resin that can be contacted with the aqueous suspension can be from a low of about 0.5 g/tonne of the particulates, about 1 g/tonne of the particulates, about 1.5 g/tonne of the particulates, about 2 g/tonne of the particulates, about 4 g/tonne of the particulates, or about 6 g/tonne of the particulates to a high of about 10 g/tonne of the particulates, about 12 g/tonne of the particulates, about 14 g/tonne of the particulates, about 16 g/tonne of the particulates, about 18 g/tonne of the particulates, about 20 g/tonne of the particulates, about 100 g/tonne of the particulates, about 200 g/tonne of the particulates or about 500 g/tonne of the particulates. In another example, the amount of the PAE resin added to the aqueous suspension can be less than 2 kg/tonne of the particulates, less than 1.5 kg/tonne of the particulates, less than 1 kg/tonne of the particulates, less than 0.75 kg/tonne of the particulates, less than 0.5 kg/tonne of the particulates, less than 0.25 kg/tonne of the particulates, less than 0.2 g/tonne of the particulates, less than 0.15 kg/tonne of the particulates, or less than 0.1 kg/tonne of the particulates. The amount of the PAE resin added to the aqueous suspension can depend, at least in part, on the specific particulate(s) in the aqueous suspension.

The PAE resin can be mixed, dispersed, blended, or otherwise combined with the aqueous suspension to provide or produce a treated mixture. One or more purified or concentrated particulate products and/or a purified or concentrated aqueous product can be recovered from the aqueous suspension. The purified particulate product can have a reduced concentration of the water relative to the aqueous suspension. Similarly, the purified water can have a reduced concentration of the particulate relative to the aqueous suspension. As used herein, the terms "aqueous suspension," "aqueous dispersion," "aqueous solution," "aqueous slurry," and "aqueous mixture," are used interchangeably, and refer to a composition that includes water and one or more particulates. It should be noted, that while the suspension is referred to as an aqueous suspension other liquid mediums can be present and/or can completely replace water as the liquid component of the suspension.

The PAE resin can be used to separate or remove one or more of a variety of particulates and/or ionic species from the aqueous (or other liquid) in which the particulates and/or ionic species are suspended, dispersed, dissolved, or otherwise mixed with. Illustrative particulates with which the PAE resin can bind or otherwise interact with in the aqueous suspension to act as a depressant and urge, influence, or otherwise cause those particles to sink in the aqueous suspension can include, but are not limited to, one or more clays, one or more clay minerals, sand, one or more glass sands containing quartz, one or more silicates, quartz, one or more carbonates, one or more metals, one or more metal oxides, or any mixture thereof. Illustrative silicates can include, but are not limited to, aluminosilicates, phyllosilicates, tectosilicates, orthosilicates, nesosilicates, sorosilicates, cyclosilicates, inosilicates, e.g., single chain or double chain, or any mixture thereof. Other particulates that the PAE resin can bind or otherwise interact with in the aqueous suspension to act as a depressant can include materials generally referred to as gangue minerals, gangue materials, or slime. Illustrative clays and/or clay minerals can include but are not limited to, kaolinite, montmorillonite, illite, chlorite, or any mixture thereof. Other particulates that the PAE resin can bind or otherwise interact with in the aqueous suspension to act as a depressant can include, but are not limited to, clays, clay minerals, glass sands containing quartz, phyllosilicates, tectosilicates, orthosilicates, silicates, quartz, slime, gangue minerals, carbonates, metals, metal oxides, aluminosilicates, kaolinite, montmorillonite, illite, chlorite, talc, bentonite, vermiculite, halloysite, zeolites, mica, muscovite, biotite, phlogopite, lepidolite, margarite, glauconite, smectites, antigorite, chrysotile, lizardite, or any mixture thereof.

The composition of other particulates or "second particulates" that can be present in the aqueous suspension can include, but are not limited to, antimony, barium, bauxite, bismuth, borate, borax, calcium, chromium, coal, cobalt, copper, feldspar, gold, graphite, gypsum, heavy hydrocarbons such as oil sands containing bitumen, iron, lead, magnesium, manganese, molybdenum, nickel, palladium, phosphates, phosphorus, platinum, potash, scandium, yttrium, lanthanum, cerium, praseodymium, neodymium, promethium, samarium, europium, gadolinium, terbium, dysprosium, holmium, erbium, thulium, ytterbium, lutetium, silver, talc, magnesium silicate, sulfates, titanium, tungsten, uranium, zinc, oxides thereof, carbonates thereof, and/or hydroxides thereof, or any mixture thereof. For example, if the particulate is or includes phosphorous and/or phosphate, the particulate can be or include one or more phosphorus containing ores. Illustrative phosphorus containing ores can include, but are not limited to, triphylite, monazite, hinsdalite, pyromorphite, vanadinite, erythrite, amblygonite, lazulite, wavellite, turquoise, autunite, carnotite, phosphophyllite, struvite, one or more apatites, one or more mitridatites, or any mixture thereof. Illustrative apatites can include, but are not limited to, hydroxylapatite, fluorapatite, chlorapatite, bromapatite, or any mixture thereof. Illustrative mitridatites can include, but are not limited to, arseniosiderite-mitridatite and arseniosiderite-robertsite. Illustrative carbonates can include, but are not limited to, calcium carbonate, sodium carbonate, magnesium carbonate, strontium carbonate, barium carbonate, potassium carbonate, manganese carbonate, iron carbonate, cobalt carbonate, copper carbonate, zinc carbonate, silver carbonate, cadmium carbonate, aluminum carbonate, lead carbonate, lanthanum carbonate, lithium carbonate, rubidium carbonate, cesium carbonate, or any mixture thereof. The iron can be in the form of metallic iron, iron oxides, iron hydroxides, iron ores or minerals, or any mixture thereof. Illustrative iron ores can include, but are not limited to, hematite, magnetite, goethite, limonite, siderite, taconite, wustite, maghemite, bernalite, laterite, schwertmannite, ferrihydrite, feroxyhyte, lepidocrocite, akaganeite, or any mixture thereof.

The PAE resin can be especially useful as a depressant in the separation of clay and/or sand from oil sands containing bitumen, the separation of clay (e.g., kaolin clay) from a clay-containing ore, the separation of clay and/or sand from aqueous clay suspensions such as coal tailings, the separation of clay and/or sand from phosphate ores, the separation of clay and/or sands from copper containing ores, the separation of clay and/or sand from potash ore, the separation of clay and/or sand from iron containing ores, the depression of animal wastes from aqueous suspensions of animal wastes, and the depression of tailings from aqueous suspensions of clay and/or sand in settling ponds. In at least one specific embodiment, the aqueous suspension can include a mixture containing one or more ores and/or other "value" material and one or more impurities, contaminants, or gangue. The aqueous suspension can be purified or separated, e.g., by froth flotation, reverse froth flotation, coagulation, flocculation, filtration, mechanical compression, and/or sedimentation, to provide or produce a purified or beneficiated ore having a reduced concentration of the one or more impurities relative to the mixture.

Aqueous suspensions that include two or more different types of particulates can be treated with the PAE resin to provide or produce a treated mixture that can be purified or separated to provide or produce a particulate-rich fraction and/or an aqueous or liquid-rich fraction. A "particulate-rich" fraction refers to a part of the liquid suspension or slurry that is enriched in solid particulates (i.e., contains a higher percentage of particulates than originally present in the liquid suspension or slurry). Conversely, the purified liquid has a lower percentage of the particulates than originally present in the aqueous suspension.

In one example, an aqueous suspension that contains a phosphate ore and clay can be separated to produce a purified clay product having a reduced concentration of the phosphate ore and water relative to the aqueous suspension before separation. Similarly, a purified phosphate product can be recovered having a reduced concentration of the clay and water relative to the aqueous suspension before separation. Similarly, a purified aqueous product or water product can be recovered having a reduced concentration of the phosphate ore and clay relative to the aqueous suspension before separation. In another example, coal tailings, which is an aqueous suspension containing water and primarily clay and/or sand can be separated to produce a purified water product and/or a purified clay and/or sand product. The purified clay and/or sand containing product can have a reduced concentration of water relative to the suspension and conversely the purified water product can have a reduced concentration of the clay and/or sand relative to the suspension. Slurry dewatering, drainage, filtration, sedimentation, mechanical compression, or any combination thereof can be used to purify the water in the coal tailings.

In another example, the PAE resin can be capable of forming a complex with metallic cations (e.g., lead and/or mercury cations) allowing these unwanted contaminants to be removed, either alone or in conjunction with solid particulates, from an aqueous suspension. As such, impure water having solid particulate contaminants and/or metallic cation contaminants can be purified. In another example, aqueous drilling fluids, which accumulate solid particles of rock (or drill cuttings) in the normal course of their use, can be treated with the PAE resin to produce a purified drilling fluid and/or a particulate product.

In another example, sewage can be treated with the PAE resin to remove or separate various contaminants from industrial and municipal waste water. Such processes can purify sewage to provide or produce both purified water that is suitable for disposal into the environment (e.g., rivers, streams, and oceans) as well as a "sludge." Sewage refers to any type of water-containing wastes which are normally collected in sewer systems and conveyed to treatment facilities. Sewage therefore includes municipal wastes from toilets (sometimes referred to as "foul waste") and basins, baths, showers, and kitchens (sometimes referred to as "sullage water"). Sewage can also include industrial and commercial waste water, (sometimes referred to as "trade waste"), as well as stormwater runoff from hard-standing areas such as roofs and streets.

Another separation process can include the purification of pulp and paper mill effluents. These aqueous waste streams generally contain solid contaminants in the form of cellulosic materials (e.g., waste paper; bark or other wood elements, such as wood flakes, wood strands, wood fibers, or wood particles; or plant fibers such as wheat straw fibers, rice fibers, switchgrass fibers, soybean stalk fibers, bagasse fibers, or cornstalk fibers; and mixtures of these contaminants). The effluent stream containing one or more cellulosic solid contaminants can be treated and purified water can be removed.

It has also been surprisingly and unexpectedly discovered that the PAE resin can significantly increase the separation efficiency and/or concentrate grade of the purified particulate product recovered via the separation process. As used herein, the term "separation efficiency" refers to the percent of the particulate (such as an ore) recovered minus (100–the percent of acid insolubles rejected). As used herein, the term "acid insolubles rejected" refers to the amount of contaminants removed from the mixture. As used herein, the term "concentrate grade" refers to the percent of the particulate in the final concentrate or purified particulate product.

Without wishing to be bound by theory, it is believed that the cationic quaternary amines, such as the azetidinium ion, contained in the PAE resin can attract particulates, especially surfaces that are anionic (i.e., carry more overall negative than positive charge). The differences in electrical characteristics between the PAE resin and the surface of the particulates can cause a mutual attraction between the PAE resin and the particulates at multiple sites, potentially even the sharing of electrons to form covalent bonds. These interactions can be explained by several theories, such as host-guest theory, hard-soft acid base theory, dipole-dipole interactions, Highest Occupied Molecular Orbital-Lowest Unoccupied Molecular Orbital (HOMO-LUMO) interactions, hydrogen bonding, and Gibbs free energy of bonding. Whatever the mechanism(s), the PAE resin can be used at low dosage amounts while maintaining or improving the overall separation of the particulates from the aqueous suspension.

The concentrate grade of the purified particulate product can be from a low of about 10%, about 15%, about 20%, about 25%, or about 35% to a high of about 40%, about 45%, about 50%, about 60%, about 70%, or about 80%. For example, the concentrate grade can be about 10% to about 80%, about 20% to about 70%, about 25% to about 60%, about 35% to about 50%, or about 35% to about 45%. In another example, the concentrate grade can be about 10% to about 18%, about 14% to about 22%, about 18% to about 24%, about 20% to about 26%, about 22% to about 28%, about 24% to about 30%, about 28% to about 34%, about 30% to about 36%, about 34% to about 40%, about 36% to about 42%, or about 38% to about 44%. In another example, the concentrate grade of the purified particulate product can be at least 10%, at least 15%, at least 20%, at least 25%, at least 30%, at least 35%, at least 40%, or at least 45% to about 50%, about 55%, about 60%, about 65%, about 70%, about 75%, about 80%, or about 85%.

The recovery of a purified particulate product from the aqueous suspension can be from a low of about 40%, about 50%, about 60%, about 65%, or about 70% to a high of about 75%, about 80%, about 85%, about 90%, about 95%, or about 99%. For example, the recovery of an ore or other "value" material in the separation process can be from about 40% to about 99%, about 60% to about 95%, about 70% to about 90%, about 70% to about 95%, or about 70% to about 75%. In another example, the recovery of a purified particulate can be at least 40%, at least 50%, at least 60%, at least 70%, at least 80%, at least 85%, or at least 90% to about 92%, about 94%, about 96%, about 98%, or about 99%.

When the purified particulate product is a phosphate, the concentrate grade of the purified particulate product can be from a low of about 15%, about 17%, or about 20%, to a high of about 27%, about 32%, or about 35%. For example, the concentrate grade of the phosphate product can be about 15% to about 17%, about 17% to about 22%, about 21% to about 27%, about 26% to about 30%, or about 27% to about 32%, about 31% to about 35%. In another example, the concentrate grade of the phosphate product can be about 10% to about 18%, about 14% to about 22%, about 18% to about 24%, about 20% to about 26%, about 22% to about 28%, about 24% to about 30%, about 28% to about 34%, about 30% to about 36%, about 34% to about 40%, about 36% to about 42%, or about 38% to about 44%.

When the purified particulate product is a phosphate or phosphate containing material, the recovery of a purified phosphate product from the aqueous suspension can be from a low of about 70%, about 75%, or about 80%, to a high of about 90%, about 95%, or about 98%. For example, the recovery of a purified phosphate product in the separation process can be from about 70% to about 78%, about 77% to about 85%, about 85% to about 92%, about 92% to about 98%, or about 94% to about 97%. In another example, the recovery of a purified phosphate product in the separation process can be at least 70%, at least 75%, at least 80%, at least 85%, or at least 90% to about 92%, about 94%, about 96%, about 98%, or about 99%.

When the purified particulate product is a phosphate or a phosphate containing material, the separation process using the PAE resin can have an acid insolubles rejection from a low of about 12%, about 15%, or about 20% to a high of about 60%, about 65%, or about 70%. For example, the acid insolubles rejection can be from about 13% to about 17%, about 16% to about 23%, about 22% to about 33%, about 32% to about 50%, about 50% to about 60%, or about 55% to about 70%.

When the purified particulate product is copper or a copper containing material, the concentrate grade of the purified copper product can be from a low of about 10%, about 15%, or about 17%, to a high of about 24%, about 27%, or about 30%. For example, the concentrate grade of the purified copper product can be about 10% to about 15%, about 13% to about 22%, about 15% to about 20%, about 17% to about 23%, about 20% to about 25%, about 22% to about 28%, or about 25% to about 30%.

When the purified particulate product is iron or an iron containing material, the concentrate grade of the purified iron product can be from a low of about 45%, about 50%, or about 55%, to a high of about 60%, about 65%, or about 70%. For example, the concentrate grade of the purified iron product can be about 45% to about 55%, about 50% to about 60%, about 55% to about 62%, about 58% to about 65%, about 62% to about 67%, about 64% to about 68%, or about 65% to about 70%.

The treated mixture or treated aqueous suspension can have a solids content from a low of about 0.1 wt %, about 1 wt %, about 2 wt %, or about 3 wt % to a high of about 20 wt %, about 40 wt %, about 60 wt %, about 70 wt %, about 80 wt %, or about 90 wt %, based on the total weight of the treated mixture. For example, the treated mixture can have a solids content of about 1 wt % to about 90 wt %, about 3 wt % to about 80 wt %, about 4 wt % to about 70 wt %, about 6 wt % to about 60 wt %, about 10 wt % to about 50 wt %, about 20 wt % to about 70 wt %, about 15 wt % to about 40 wt %, about 7 wt % to about 20 wt %, or about 25 wt % to about 75 wt %. As understood by those skilled in the art, the solids content of the depressant can be measured by determining the weight loss upon heating a small sample, e.g., 1-5 grams of the reaction mixture, to a suitable temperature, e.g., 125° C., and a time sufficient to remove the liquid therefrom.

The liquid mixture combined with the PAE resin can be conditioned for a predetermined period of time. Conditioning the mixture upon the addition of the PAE resin can facilitate contact between the liquid mixture and the PAE resin. Conditioning can include, but is not limited to, agitating the mixture(s) for a given time period prior to subjecting the mixture to separation. For example, the liquid mixture containing the PAE resin, can be stirred, blended, mixed, or otherwise agitated for a time from a low of about 30 seconds, about 1 minute, about 2 minutes, about 3 minutes or about 4 minutes to a high of about 5 minutes, about 10 minutes, about 15 minutes, about 20 minutes, about 30 minutes, about 1 hour, or about 24 hours. Conditioning the mixture can also include heating (or cooling) the mixture to a temperature from a low of about 1° C., about 20° C., or about 35° C. to a high of about 60° C., about 80° C., or about 95° C.

Conditioning the mixture can also include adjusting the pH of the mixture. The pH of the liquid mixture containing the PAE resin can be from a low of about 2, about 3, about 4, or about 5 to a high of about 8, about 9, about 10, about 11, or about 12. For example, the pH of the mixture can be from about 2 to about 12, about 4 to about 11, or about 6 to about 10. Any one or combination of acid and/or base compounds can be combined with the liquid mixture to adjust the pH thereof.

Illustrative acid compounds that can be used to adjust the pH of the mixture can include, but are not limited to, one or more mineral acids, one or more organic acids, one or more acid salts, or any combination thereof. Illustrative mineral acids can include, but are not limited to, hydrochloric acid, nitric acid, phosphoric acid, sulfuric acid, or any combination thereof. Illustrative organic acids can include, but are not limited to, acetic acid, formic acid, citric acid, oxalic acid, uric acid, lactic acid, or any combination thereof. Illustrative acid salts can include, but are not limited to, ammonium sulfate, sodium bisulfate, sodium metabisulfite, or any combination thereof.

Illustrative base compounds that can be used to adjust the pH of the mixture can include, but are not limited to, hydroxides, carbonates, ammonia, amines, or any combination thereof. Illustrative hydroxides can include, but are not limited to, sodium hydroxide, potassium hydroxide, ammonium hydroxide (e.g., aqueous ammonia), lithium hydroxide, and cesium hydroxide. Illustrative carbonates can include, but are not limited to, sodium carbonate, sodium bicarbonate, potassium carbonate, and ammonium carbonate. Illustrative amines can include, but are not limited to, trimethylamine, triethylamine, triethanolamine, diisopropylethylamine (Hunig's base), pyridine, 4-dimethylaminopyridine (DMAP), and 1,4-diazabicyclo[2.2.2]octane (DABCO).

The method for separating particulates from an aqueous suspension can include sedimentation, i.e., the particulates, are allowed to settle as a bottoms and the liquid optionally containing one or more other particulates such as a value material having a reduced concentration of the particulates. Coagulation, which refers to the destabilization of suspended solid particles by neutralizing the electric charge that separates them can also be used. Flocculation, which refers to the bridging or agglomeration of solid particles together into clumps or flocs, thereby facilitating their separation by settling or flotation, depending on the density of the flocs relative to the liquid can also be used. Filtration can also be employed as a means to separate the larger flocs. Mechanical compression can compress the aqueous suspension against a porous body, e.g., a membrane, to force or otherwise urge the water or other liquid through the porous body and collect the particulates on the porous body to form a filter cake thereon. In another example, the method for separating particulates from an aqueous suspension can include agitating the aqueous suspension by mechanically stirring (e.g., impeller, paddle, stirrer), shaking, directing sound waves (e.g., ultrasonic sound waves) into the aqueous mixture, or otherwise moving the aqueous mixture, or any combination thereof. These types of separation processes are well known to those of skill in the art.

Also noted above, the aqueous suspension can be separated or purified via a froth flotation process. Froth flotation is a separation process based on differences in the tendency of various materials to associate with rising air bubbles. The PAE resin can be added to the aqueous suspension to provide or produce the treated mixture. For example, the method for separating particulates from an aqueous suspension can include agitating the aqueous suspension by passing gas or air bubbles through the aqueous mixture. Some materials (e.g., value minerals) will, relative to others (e.g., contaminants), exhibit preferential affinity for air bubbles, causing them to rise to the surface of the aqueous slurry, where they can be collected in a froth concentrate. A degree of separation can thereby be provided. In "reverse" froth flotation, it is the contaminant that can preferentially float and concentrated at the surface, with the ore and/or other value material concentrated in the bottoms. Froth flotation is a separation process well known to those skilled in the art. Illustrative froth flotation processes can include those discussed and described in U.S. Pat. Nos. 8,425,781 and 8,127,930, and U.S. Patent Application Publication Nos.: 2009/0178959 and 2009/0194466.

One or more additives can be added to the aqueous suspension in addition to the PAE resin. Illustrative additional additives can include, but are not limited to, dispersants, silicates, collectors, conventional depressants, coagulants, flocculants, frothing agents, extender oils, pH modifiers, activators, or any mixture thereof. Illustrative dispersants can include, but are not limited to, silica, silicates, polysiloxanes, tannins, lignosulfonates, cyanide salts, polyacrylic acid based polymers, naphthalene sulfonates, benzene sulfonates, pyrophosphates, phosphates, phosphonates, tannates, polycarboxylate polymers, sulfates, or any mixture thereof. In at least one example, the dispersant can be or include one or more silicates.

Illustrative silicates can include, but are not limited to, sodium silicate or "water glass," potassium silicate, or any mixture thereof. Illustrative polysiloxanes can include, but are not limited to, hexamethylcyclotrisiloxane, hexamethyldisiloxane, octamethylcyclotetrasiloxane, octamethyltrisiloxane, decamethylcyclopentasiloxane, decamethyltetrasiloxane, dodecamethylcyclohexasiloxane, polydimethylsiloxane or any mixture thereof. Illustrative lignosulphonates can include, but are not limited to, calcium lignosulfonate, magnesium lignosulfonate, sodium lignosulfonate, ammonium lignosulfonate or any mixture thereof. Illustrative cyanide salts can include, but are not limited to, sodium cyanide, potassium cyanide, calcium cyanide, magnesium cyanide or any combination thereof. Illustrative polyacrylic acid based polymers can include, but are not limited to sodium polyacrylate, potassium polyacrylate, polymethacrylic acid, copolymers of any combination of acylic acid, methacrylic acid, acrylate, methacrylate, maleic acid, fumaric acid, maleic anhydride, or any combination thereof. A suitable sodium salt of a polyacrylic acid based polymer can include ACUMER® 9141, available from Rohm and Haas. Illustrative naphthalene sulfonates can include, but are not limited to, sodium naphthalene sulfonate, potassium naphthalene sulfonate, or any mixture thereof. Illustrative benzene sulfonates can include, but are not limited to, alkylbenzene sulfonates, benzene disulfonates, sodium benzene sulfonate, potassium benzene sulfonate, or any mixture thereof. Illustrative pyrophosphates can include, but are not limited to, alkylpyrophosphates, sodium pyrophosphate, potassium pyrophosphate, calcium pyrophosphate, magnesium pyrophosphate, or any mixture thereof. Illustrative phosphates can include, but are not limited to, phosphate esters, sodium phosphate, potassium phosphate, calcium phosphate, magnesium phosphate, or any mixture thereof. Illustrative phosphonates can include, but are not limited to alkyl phosphonates, aryl phosphonates, aryl polyphosphonates, alkyl polyphosphonates or any mixture thereof. Illustrative polycarboxylate polymers can include, but are not limited to, sodium polyacrylate, potassium polyacrylate, polymethacrylic acid, copolymers of any combination of acylic acid, methacrylic acid, acrylate, methacrylate, maleic acid, fumaric acid, maleic anhydride, or any combination thereof, carboxymethyl cellulose, or any mixture thereof.

Illustrative collectors can include, but are not limited to, one or more fatty acids, one or more oxidized fatty acids, one or more maleated fatty acids, one or more oxidized and maleated fatty acids, one or more fatty acid monoesters of a polyol, one or more fatty acid diesters of a polyol, one or more amines, xanthates, one or more fuel oils, fatty acid soaps, nonionic surfactants, crude tall oil, oleic acid, tall oil fatty acids, saponified natural oils, alkyl dithiophosphates, alkyl thiophosphates fatty hydroxamates, alkyl sulfonates, alkyl sulfates, alkyl phosphonates, alkyl phosphates, alkyl ether amines, alkylether diamines, alkyl amido amines, or any mixture thereof.

Illustrative conventional depressants can include, but are not limited to, sodium hexametaphosphate, guar gum, sodium silicate, starch, tannins, dextrins, lignosulphonic acids, carboxymethyl cellulose, cyanide salts, phosphoric acid, polyamino-aldehyde resins, or ay mixture thereof. In at least one specific embodiment, the PAE resin can be used in the absence of any polysaccharide or starch. Said another way, the aqueous suspension or treated mixture that contains the PAE resin can be free from any intentionally added polysaccharide, such as starch. In at least one other specific embodiment, the aqueous suspension or treated mixture that contains the PAE resin can contain less than 10 wt % of any polysaccharide, less than 7 wt % of any polysaccharide, less than 5 wt % of any polysaccharide, less than 3 wt % of any polysaccharide, less than 2 wt % of any polysaccharide, less than 1 wt % of any polysaccharide, less than 0.7 wt % of any polysaccharide, less than 0.5 wt % of any polysaccharide, less than 0.3 wt % of any polysaccharide, less than 0.2 wt % of any polysaccharide, less than 0.1 wt % of any polysaccharide, less than 0.07 wt % of any polysaccharide, less than 0.05 wt % of any polysaccharide, less than 0.03 wt % of any polysaccharide, less than 0.01 wt % of any polysaccharide, less than 0.007 wt % of any polysaccharide, less than 0.005 wt % of any polysaccharide, less than 0.003 wt % of any polysaccharide, or less than 0.001 wt % of any polysaccharide, based on the weight of the treated mixture. In at least one other specific embodiment, the aqueous suspension or treated mixture that contains the PAE resin can contain less than 10 wt % of any polysaccharide, less than 7 wt % of any polysaccharide, less than 5 wt % of any polysaccharide, less than 3 wt % of any polysaccharide, less than 2 wt % of any polysaccharide, less than 1 wt % of any polysaccharide, less than 0.7 wt % of any polysaccharide, less than 0.5 wt % of any polysaccharide, less than 0.3 wt % of any polysaccharide, less than 0.2 wt % of any polysaccharide, less than 0.1 wt % of any polysaccharide, less than 0.07 wt % of any polysaccharide, less than 0.05 wt % of any polysaccharide, less than 0.03 wt % of any polysaccharide, less than 0.01 wt % of any polysaccharide, less than 0.007 wt % of any polysaccharide, less than 0.005 wt % of any polysaccharide, less than 0.003 wt % of any polysaccharide, or less than 0.001 wt % of any polysaccharide, based on the weight of the PAE resin in the treated mixture.

In one or more embodiments, one or more polysaccharides, e.g., starch, can be mixed with the PAE resin to produce a mixture of the PAE resin and the one or more polysaccharides having a concentration of greater than 10 wt %, greater than 11 wt %, greater than 12 wt %, greater than 15 wt %, greater than 20 wt %, greater than 30 wt %, or greater than 40 wt % of the one or more polysaccharides, based on the combined weight of the PAE resin and the one or more polysaccharides. For example, a polysaccharide such as starch, can be mixed with the PAE resin to produce a mixture of the PAE resin and the polysaccharide having a concentration of less than 90 wt %, less than 85 wt %, less than 80 wt %, less than 75 wt %, less than 70 wt %, less than 65 wt %, less than 60 wt %, less than 55 wt %, less than 50 wt %, less than 45 wt %, less than 40 wt %, less than 35 wt %, less than 30 wt %, less than 25 wt %, less than 20 wt %, less than 20 wt %, less than 15 wt %, less than 10 wt %, less than 5 wt %, or less than 1 wt % of the polysaccharide, based on the total amount of the PAE resin and the polysaccharide. In another example, a polysaccharide such as starch can be mixed with the PAE resin at a concentration of about 11 wt % to about 15 wt % of the polysaccharide, about 11 wt % to about 85 wt % of the polysaccharide, about 12 wt % to about 50 wt % of the polysaccharide, about 11 wt % to about 20 wt % of the polysaccharide, about 15 wt % to about 35 wt % of the polysaccharide, about 13 wt % to about 35 wt % of the polysaccharide, about 20 wt % to about 65 wt % of the polysaccharide, about 20 wt % to about 75 wt % of the polysaccharide, based on the combined weight of the PAE resin and polysaccharide.

Illustrative frothing agents can include, but are not limited to, methylisobutylcarbinol, pine oil, polypropylene oxides, polyethylene oxides, polysorbitanes, xylenols, or any mixture thereof. Illustrative coagulants can include, but are not limited to, alum, ferrous sulfate, ferric sulfate, ferric chloride, lime, quick lime, polyDADMAC or any mixture thereof. Illustrative flocculants can include, but are not limited to guar gum, gelatin, chitosan, isinglass, strychnos polyacrylamides, or any mixture thereof.

In at least one specific embodiment, the depressant can include the PAE resin one or more polysaccharides. If the depressant includes a polysaccharide, the depressant can be less than 90 wt %, less than 85 wt %, less than 80 wt %, less than 75 wt %, less than 70 wt %, less than 65 wt %, less than 60 wt %, less than 55 wt %, less than 50 wt %, less than 45 wt %, less than 40 wt %, less than 35 wt %, less than 30 wt %, less than 25 wt %, less than 20 wt %, less than 20 wt %, less than 15 wt %, less than 10 wt %, less than 5 wt %, or less than 1 wt % of the polysaccharide, based on the total amount of the PAE resin and the polysaccharide.

If the one or more additives are present, a weight ratio between the additive added to the aqueous suspension and the PAE resin can be from a low of about 0.001:1, about 0.01:1, about 0.1:1, about 1:1, about 5:1, about 10:1, about 50:1 or about 100:1 to a high of about 250:1, about 500:1, about 750:1, or about 1,000:1. For example, the weight ratio between the additive and the PAE resin can be from about 0.001:1 to about 10:1, about 1:1 to about 500:1, about 100:1 to about 1,000:1, about 0.1:1 to about 50:1, or about 0.2:1 to about 75:1.

Suitable PAE resins that can be used as a depressant can be prepared by reacting one or more polyamidoamines and one or more epihalohydrins. For example, a polyamidoamine can be prepared by reacting (1) one or more dicarboxylic acids and/or one or more esters of a dicarboxylic acid and (2) one or more polyamines. The polyamidoamine can also be referred to as a "prepolymer." The polyamine can include secondary and/or tertiary amine groups. The dicarboxylic acid can be a saturated aliphatic dibasic carboxylic acid, often containing from about 3 to about 10 carbon atoms and mixtures thereof. Dicarboxylic acids containing from 4 to 8 carbon atoms chains can be used, with adipic acid, or glutaric acid being most often used. Illustrative dicarboxylic acids can include, but are not limited to, malonic acid, succinic acid, glutaric acid, adipic acid, suberic acid, sebacic acid, or any mixture thereof. Illustrative esters of dicarboxylic acids can include, but are not limited to, dimethyl glutarate, diethyl glutarate, dimethyl adipate, diethyl adipate, or any mixture thereof. Illustrative epihalohydrins can include, but are not limited to, epichlorohydrin, epibromohydrin, epifluorohydrin, epiiodohydrin, or any mixture thereof. As such, in at least one embodiment, the PAE resin can be or include one or more polyamidoamine-epichlorohydrin resins, one or more polyamidoamine-epibromohydrin resins, one or more polyamidoamine-epifluorohydrin resins, one or more polyamidoamine-epiiodohydrin resins, any combination thereof, or any mixture thereof.

The polyamine reacted with the dicarboxylic acid and/or ester of a dicarboxylic acid to produce the polyamidoamine can include, but is not limited to, one or more compounds having Formula (I).

$$H_2N[(CH_2)_xNH]_yH \qquad (I)$$

where x and y are integers independently selected from 2 to 10. Specific examples of polyalkene polyamines can include, but are not limited to, diethylenetriamine (x=2, y=2), triethylenetetramine (x=2, y=3), tripropylenetetramine (x=3, y=3) tetraethylenepentamine (x=2, y=4), and pentaethylenehexamine (x=2, y=5). Other examples of polyamines can include, but are not limited to, methyl bis(3-aminopropyl)-amine, dipropylenetriamine, bis(hexamethylene)triamine, bis-2-hydroxyethyl ethylenediamine. The polyamidoamine can include secondary amine groups derived from a polyalkylene polyamine.

The polyamidoamine can be prepared by heating a mixture of the dicarboxylic acid and the polyamine to about 110° C. to about 250° C. For example, the mixture of the dicarboxylic acid and the polyamine can be heated to a temperature from a low of about 110° C., about 125° C., about 140° C. to a high of about 160° C., about 175° C., about 190° C., or about 200° C. under atmospheric pressure.

In carrying out the reaction between the polyamine and the dicarboxylic acid, the amount of the dicarboxylic acid can be sufficient to react substantially completely with the primary amine groups of the polyalkylene polyamine but insufficient to substantially react with the secondary amine groups of the polyamine. The molar ratio of the polyamine to the dicarboxylic acid can be from a low of about 0.8:1, about 0.85:1, about 0.9:1, about 0.95:1, or about 1:1 to a high of about 1:1, about 1.05:1, about 1.1:1, about 1.2:1, about 1.3:1, or about 1.4:1. For example, the molar ratio of the polyamine to the dicarboxylic acid can be about 0.8:1 to about 1.4:1, about 0.9:1 to about 1.2:1, about 0.9:1 to about 1:1, about 1:0.95 to about 1:1.05, about 1:0.9 to about 1:1.1, about 1:0.85 to about 1:1.1, or about 0.95:1 to about 1.05:1. In another example, the molar ratio of the polyamine to the dicarboxylic acid can be about 0.9 moles to about 1.1 moles of a polyamine to about 1.1 moles to about 0.9 moles of a dicarboxylic acid.

If the reaction between the polyamine and the dicarboxylic acid is carried out under a reduced pressure the reaction temperature can be reduced to about 75° C. to 150° C. The time of reaction can depend, at least in part, on the temperature and/or pressure and can generally be from about 0.5 hours to about 4 hours. The reaction can be continued to substantial completion. The reaction between the polyamine and the dicarboxylic acid can produce water as a byproduct, which can be removed by distillation. At the end of the reaction, the resulting product can be dissolved or dispersed in water to provide any desired concentration such as an aqueous polyamidoamine resin having about 50 wt % total resin solids.

When a diester is used instead of dicarboxylic acid for reaction with the polyamine, the polymerization can be conducted at a lower temperature, such as about 100° C. to about 175° C. under atmospheric pressure. In this case, the byproduct will be an alcohol, the type of alcohol depending upon the identity of the diester. For example, if a dimethyl ester is used as a reactant, the alcohol byproduct will be methanol. In another example, if a diethyl ester is used as a reactant, the alcohol byproduct will be ethanol. The molar ratio between the polyamine and the diester can be the same as the ratio between the polyamine and the dicarboxylic acid. If the reaction between the polyalkylene polyamine and the diester is carried out under a reduced pressure the reaction temperature can be reduced to about 75° C. to about 150° C.

To produce the PAE resin, the amount of the epihalohydrin reacted with the polyamidoamine can be controlled or limited. For example, the molar ratio of the epihalohydrin to the polyamidoamine can be from a low of about 0.75:1, about 0.8:1, about 0.85:1, about 0.9:1, about 0.95:1, or about 1:1 to a high of about 1.2:1, about 1.4:1, about 1.6:1, about 1.8:1, or about 2:1. In another example, the molar ratio of the epihalohydrin to the polyamidoamine can be about 0.55:1 to about 1:1, about 0.75:1 to about 2:1, about 0.9:1 to about 1.1:1, about 1.2:1 to about 1.4:1, about 1:1 to about 1.5:1, about 1.1:1 to about 1.7:1, about 1.4:1 to about 1.9:1, or about 0.95:1 to about 1.7:1. In another example, the molar ratio of the epihalohydrin to the polyamidoamine can be about 0.75 moles to about 1.8 moles epihalohydrin to about 0.56 moles to about 1.35 moles of the polyamidoamine.

The polyamidoamine can be reacted with the epihalohydrin at a temperature from a low of about 0° C., about 10° C., about 20° C., about 25° C., about 30° C., or about 35° C. to a high of about 60° C., about 70° C., about 80° C., about 90° C., or about 100° C. The extent of reaction between the polyamidoamine and the epihalohydrin can be controlled so that the polyamidoamine is only partially reacted with the epihalohydrin. The reaction can be controlled such that a reaction product having about 25 wt % to about 35 wt % solids has a viscosity of about 350 cP or less, or 300 cP or less, or 250 cP or less at a temperature of about 25° C. In another example the reaction can be controlled such that the reaction product having about 25 wt % to about 35 wt % solids has a viscosity of about 125 cP to about 375 cP, about 200 cP to about 300 cP, about 250 cP to about 350 cP, or about 220 cP to about 375 cP at a temperature of about 25° C. In another example, the reaction can be controlled such that a reaction product or PAE resin having a solids concentration of about 29 wt % has a viscosity from about 125 cP to about 375 cP, about 200 cP to about 300 cP, about 225 cP to about 275 cP, about 200 cP to about 250 cP, or about 250 cP to about 300 cP at a temperature of about 25° C.

The viscosity of the PAE resin can be determined using a viscometer at a temperature of about 25° C. For example, a Brookfield Viscometer, Model DV-II+, with a small sample adapter with, for example, a number 31 spindle, can be used. The small sample adapter can allow the sample to be cooled or heated by the chamber jacket to maintain the temperature of the sample surrounding the spindle at a temperature of about 25° C.

When the desired viscosity is reached, sufficient water can be added to adjust the solids content of the PAE resin solution to a desired amount. For example, the PAE resin can have a solids concentration from a low of about 5 wt %, about 10 wt %, or about 15 wt % to a high of about 20 wt %, about 30 wt %, about 40 wt %, about 60 wt %, about 80 wt %, about 90 wt %, or about 95 wt %. In another example the PAE resin can have a solids concentration from a low of about 8 wt %, about 10 wt %, about 12 wt % or about 14 wt % to a high of about 22 wt %, about 25 wt %, about 27 wt %, or about 30 wt %. In another example, the PAE resin can be in the form of an aqueous dispersion, suspension, or solution and have a solids concentration greater than about 20 wt % to about 50 wt %.

The reaction between the polyamidoamine and the epihalohydrin can be carried out in an aqueous solution to moderate or otherwise control the reaction. Although not necessary, pH adjustment can be done to increase or decrease the rate of residual crosslinking.

The polyamidoamine that can be used for producing the PAE resin can have a weight average molecular weight (in Daltons) of about 10,000 and up to about 100,000. For example, the polyamidoamine can have a weight average molecular weight from a low of about 10,000, about 15,000, about 20,000, about 25,000, or about 30,000 to a high of about 55,000, about 65,000, about 75,000, about 80,000, or about 90,000. In another example, the polyamidoamine can have a weight average molecular weight of about 35,000 to about 55,000, about 35,000 to about 45,000, about 40,000 to about 50,000, about 20,000 to about 65,000, about 30,000 to about 70,000, or about 35,000 to about 50,000.

As known by those skilled in the resin molecular weights can be determined using Gel Permeation Chromatography (GPC). A suitable GPC method can use tetrahydrofuran as a solvent/diluent and a system of two mixed C chromatographic columns preceding a 500 Angstroms PL gel column, all available from Resin Laboratories (now part of Varian, Inc.). The column arrangement can be calibrated using a range of polystyrene standards. For determining the molecular weight of a particular resin sample, the sample can be injected along with polystyrene having a molecular weight of 250,000 and toluene as an internal standard. A Model 759A Absorbance Detector from Applied Biosystems can be used to monitor the column output and assist the molecular weight determination. The method of determining the molecular weight of a resin sample is well understood by those skilled in the art and other configurations and reference materials can conveniently be used.

One can improve the stability of the PAE resin to resist gelation by adding sufficient acid to reduce the pH to less than about 6, less than about 5, or less than about 4. Any suitable inorganic or organic acid such as hydrochloric acid, sulfuric acid, methanesulfonic acid, nitric acid, formic acid, phosphoric acid and acetic acid may be used to stabilize the product. Other compounds that can be used to improve the stability of the PAE resin can include, but are not limited to, urea, aluminum sulfate, or a mixture thereof.

The weight average molecular weight of the PAE resin can be from a low of about 300,000, about 400,000, about 500,000, about 600,000, about 650,000, or about 700,000 to a high of about 950,000, about 1,000,000, about 1,100,000, about 1,200,000, or about 1,300,000. For example, the weight average molecular weight of the resin can be about 400,000 to about 1,200,000, about 500,000 to about 1,050,000, about 600,000 to about 1,000,000, about 750,000 to about 950,000, about 800,000 to about 850,000, or about 850,000 to about 900,000. In another example, the PAE resin can have a weight average molecular weight of less than 1,300,000, less than 1,200,000, less than 1,100,000, less than 1,000,000, or less than 950,000 and greater than about 400,000, greater than about 500,000, greater than about 600,000, greater than about 700,000, or greater than about 750,000.

When the PAE resin is added to the aqueous solution, the PAE resin can have a viscosity from a low of about 5 cP, about 25 cP, about 50 cP, about 75 cP, about 100 cP, about 125 cP, about 150 cP, about 175 cP, or about 200 cP, to a high of about 300 cP, about 400 cP, about 500 cP, about 750 cP, or about 1,000 cP at a temperature of about 25° C. For example, when the PAE resin is added to the aqueous solution, the PAE resin can have a viscosity of about 5 cP to about 50 cP, about 50 cP to about 100 cP, about 80 cP to about 250 cP, about 100 cP to about 150 cP, about 150 cP to about 200 cP, about 200 cP to about 250 cP, about 250 cP to about 350 cP, or about 350 cP to about 1,000 cP at a temperature of about 25° C. In another example, the PAE resin can have a viscosity from a low of about 5 cP, about 25 cP, about 50 cP, about 75 cP, about 100 cP, about 125 cP, about 150 cP, about 175 cP, or about 200 cP, to a high of about 300 cP, about 400 cP, about 500 cP, about 750 cP, or about 1,000 cP at a temperature of about 25° C. and a solids content of about 20 wt % to about 30 wt %. In another example, the PAE resin can have a viscosity from a low of about 5 cP, about 25 cP, about 50 cP, about 75 cP, about 100 cP, about 125 cP, about 150 cP, about 175 cP, or about 200 cP, to a high of about 300 cP, about 400 cP, about 500 cP, about 750 cP, or about 1,000 cP at a temperature of about 25° C. and a solids content of about 25 wt % to about 35 wt %. In another example, the PAE resin can have a viscosity from a low of about 5 cP, about 25 cP, about 50 cP, about 75 cP, about 100 cP, about 125 cP, about 150 cP, about 175 cP, or about 200 cP, to a high of about 300 cP, about 400 cP, about 500 cP, about 750 cP, or about 1,000 cP at a temperature of about 25° C. and a solids content of about 25 wt %.

The PAE resin can have a pH from a low of about 2.5, about 3, about 3.5, or about 4 to a high of about 4.5, about 5, about 5.5, about 6, about 6.5, about 7, or about 8. For example, the pH of the PAE resin can be about 2 to about 5, about 2.5 to about 3.5, about 3 to about 4.5, about 4 to about 6, or about 2.5 to about 5.5.

The PAE resin can have a charge density of about 1.5 mEq/gram of solids, 1.7 mEq/gram of solids, about 1.8 mEq/gram of solids, about 1.85 mEq/gram of solids, about 1.9 mEq/gram of solids, about 1.95 mEq/gram of solids, or about 2 mEq/gram of solids to about 2.2 mEq/gram of solids, about 2.3 mEq/gram of solids, about 2.4 mEq/gram of solids, about 2.5 mEq/gram of solids, about 2.6 mEq/gram of solids, about 2.7 mEq/gram of solids, or about 3 mEq/gram of solids. For example, the PAE resin can have a charge density of about 1.50 mEq/gram of solids to about 1.7 mEq/gram of solids, about 1.5 mEq/gram of solids to about 3 mEq/gram of solids, about 1.9 mEq/gram of solids to about 2.5 mEq/gram of solids, about 2.0 mEq/gram of solids to about 2.8 mEq/gram of solids, about 1.7 mEq/gram of solids to about 2.4 mEq/gram of solids, or about 2.5 mEq/gram of solids to about 3 mEq/gram of solids. The charge density of the PAE resin can be measured by streaming electrode potential using a Mütek PCD titrator.

The PAE resin can have a ratio of azetidinium ions to amide residues, which can be abbreviated by "Azet ratio," of about 0.5, about 0.55, about 0.6, or about 0.65 to a high of about 0.7, about 0.75, about 0.8, about 0.85, or about 0.9. For example, the PAE resin can have an Azet ratio of about 0.55 to about 0.8, about 0.65 to about 0.8, about 0.55 to about 0.7, or about 0.6 to about 0.7. The Azet ratio can be measured by quantitative $^{13}$C NMR by comparing the methylene carbons of the azetidinium versus the methylenes of the acid residue in the backbone.

Suitable methods for preparing PAE resins can include those discussed and described in U.S. Pat. Nos. 2,926,116; 3,058,873; 3,772,076; 5,338,807; EP Patent No.: EP 0488767; Canadian Patent Application Publication No.: CA 979,579; and GB Patent Application Publication No.: GB 865,727(A).

Many commercially available PAE resins are known and can be used as a depressant for the purification or separation of an aqueous suspension. Suitable commercially available PAE resins can include, but are not limited to, AMRES® resins available from Georgia-Pacific Chemicals LLC, KYMENE® resins available from Ashland, and FennoStrength resins available from Kemira.

EXAMPLES

In order to provide a better understanding of the foregoing discussion, the following non-limiting examples are offered. Although the examples can be directed to specific embodiments, they are not to be viewed as limiting the invention in any specific respect.

The PAE resin used in Examples I-V below was made according to the following procedure. A prepolymer was made that was reacted with epichlorohydrin to produce the PAE resin. A glass reactor with a 5-neck top and equipped with a stainless steel stirring shaft, a reflux condenser, a temperature probe, and a hot oil bath for heating was used to make the prepolymer. To the reactor was added about 500.5 grams of diethylenetriamine (DETA). The agitator was turned on and about 730 grams of adipic acid was added slowly over about 45 minutes with stirring. The reaction temperature increased from about 25° C. to about 145° C. while the adipic acid was added to the reactor. After the adipic acid was added to the reactor, the reactor was immersed in a hot oil bath heated to a temperature of about 160° C. At a temperature of about 150° C. the reaction mixture began to reflux. The reflux condenser was reconfigured for distillation and a distillate was collected in a separate receiver. The reaction was sampled at 30 minute intervals. Each sample was diluted to 45% solids with water and the viscosity was measured with a Brookfield viscometer and small sample adapter cup. When the sample reached a viscosity of about 290 cP at a temperature of about 25° C., the distillation condenser was reconfigured to reflux. Water was added slowly to the reaction mixture through the reflux condenser to dilute and cool the reaction mixture. Water was added to obtain a final prepolymer that had a solids concentration of about 45 wt %. The viscosity of the prepolymer was about 290 cP at a temperature of about 25° C., as measured by the Brookfield small sample adapter. The prepolymer had a weight average molecular weight of about 39,900 Daltons. The prepolymer had an intrinsic viscosity of about 0.1239, as measured by an Ubelhold capillary viscometer, 1N KCl. The sample had a secondary amine number of about 4.71 meq/gram solid, as measured by HCl titration using a Brinkmann titrator.

A glass reactor with a 5-neck top and equipped with a glass stirring shaft and Teflon paddle, an equal pressure addition funnel, a temperature and pH probe, stainless steel cooling coils, sample valve, and heating mantle was used to make the PAE resin. To the reactor was added about 835.6 grams of the prepolymer prepolymer. About 91 grams of water was added to the reactor and the agitator was started. The reaction temperature was adjusted to about 25° C. and about 220.2 grams of epichlorohydrin was added via the addition funnel. The reaction temperature was held at a temperature of about 30° C. for about 30 minutes, and then about 813 grams of water was added to the reactor. The reaction mixture was heated to a temperature of about 60° C. and was allowed to react to a B Gardner-Holdt bubble tube viscosity. The reaction mixture was cooled to a temperature of about 55° C. and was allowed to react to an EF Gardner-Holdt bubble tube viscosity. The reaction was cooled to a temperature of about 48° C. and was allowed to react to a KL Gardner-Holdt bubble tube viscosity. Full cooling was applied and the pH was adjusted to about 3 with the simultaneous addition of a concentrated sulfuric acid (about 18 grams) and a concentrated formic acid (about 18.6 grams). After the reaction temperature reached a temperature of about 25° C., water was added to produce the PAE resin that had a solids content of about 25 wt %. The PAE resin that had a solids content of about 25 wt % had a viscosity of about 170 cP at a temperature of about 25° C., as measured with a Brookfield small sample adapter. The PAE resin had a weight average molecular weight of about 837,000 daltons. The PAE resin had a charge density of about 2 meq+/gram, as measured by streaming electrode potential with a Mitek PCD titrator. The PAE resin had an azetidinium ion ratio of about 0.67 ($^{13}$C-NMR), and an azetidinium ion equivalent weight of about 1,834.

Example I

Montmorillonite Settling Test

The PAE resin was combined with montmorillonite in water and the mixture was agitated. The PAE resin was compared with a urea-formaldehyde (UF) resin, which is a common depressant used in the purification of aqueous suspensions containing montmorillonite. The PAE resin had a solids content of about 25 wt % in water. The UF resin had a solids content of about 45 wt % in water. About 1 mL of the PAE or UF resin solution was combined and mixed with 19 mL of water. About 12.5 g of montmorillonite was added to a graduated cylinder. The graduated cylinder was filled with water to a volume of 200 mL. The water/clay suspension was vigorously mixed to form an aqueous suspension. The PAE resin was added to the aqueous suspension. The graduated cylinder was sealed and then inverted 3 times to mix the PAE resin with the aqueous suspension. The graduated cylinder was placed on a bench top and the contents were allowed to settle for five minutes. At the end of the time period, the level from 200 mL to which the clay had settled was recorded. The results are shown in Table 1 below.

TABLE 1

Montmorillonite Settling Results

| Sample | Resin | Dose (μL) | Dose by Solids (mg) | Level of Settling (mL) |
|---|---|---|---|---|
| C1 | UF | 1,000 | 25 | 68 |
| Ex. 1 | PAE | 1,000 | 12.5 | 55 |
| C2 | UF | 250 | 6.25 | 64 |
| Ex. 2 | PAE | 250 | 3.13 | 65 |
| C3 | UF | 100 | 2.5 | 170-solution very hazy |
| Ex. 3 | PAE | 100 | 1.25 | 68 |
| C4 | UF | 50 | 1.25 | None |
| Ex. 4 | PAE | 50 | 0.625 | 64 |
| Ex. 5 | PAE | 10 | 0.125 | 72-solution slightly hazy |

Surprisingly and unexpectedly, on a resin solids basis, only about 2% of the PAE resin was needed to achieve the same level of settling of the montmorillonite as compared to the UF resin. More particularly, as shown in Table 1, the minimum dosage level for the UF resin that could be used to depress the montmorillonite to a level greater than 75 mL was 250 μL. In contrast, only 10 μL of the PAE resin was required to depress the montmorillnite to a level greater than 75 mL.

Example II

Kaolin Settling Test

The same test as described in Example I was also conducted with kaolin clay replacing montmorillonite. The slurry water level was 250 mL rather than 200 mL. The results are shown below in Table 2.

TABLE 2

Kaolin Settling Results

| Sample | Resin | Dose (μL) | Dose by Solids (mg) | Level of Settling (mL) |
|---|---|---|---|---|
| C5 | UF | 8,000 | 200 | 184 |
| C6 | UF | 4,000 | 100 | 140 |
| C7 | UF | 2,000 | 50 | 181 |
| C8 | UF | 500 | 12.5 | 206 |
| C9 | UF | 250 | 6.25 | 199 |
| Ex. 6 | PAE | 1,000 | 12.5 | 96 |
| Ex. 7 | PAE | 500 | 6.25 | 84 |
| Ex. 8 | PAE | 250 | 3.13 | 128 |
| Ex. 9 | PAE | 50 | 0.625 | 208 |

The PAE resin showed increased depressant performance when compared to a UF resin, though greater quantities of both resin were necessary to depress the gangue mineral. By weight, only 6% of the PAE resin was needed as compared to the optimal dosage of UF resin. Additionally, the PAE resin caused the Kaolin clay to settle to a lower level than the UF resin.

Example III

Talc Settling Test

The same test as described in Example II was also conducted with 10 micron talc replacing kaolin. The results are shown below in Table 3.

TABLE 3

Talc Settling Results

| Sample | Resin | Dose (μL) | Dose by Solids (mg) | Level of Settling (mL) |
|---|---|---|---|---|
| C10 | UF | 6,000 | 150 | 163-solution hazy |
| C11 | UF | 2,000 | 50 | 144-solution hazy |
| C12 | UF | 500 | 12.5 | 160-solution hazy |
| C13 | UF | 250 | 6.25 | 170-solution hazy |
| Ex. 10 | PAE | 500 | 6.25 | 126-solution clear |
| Ex. 11 | PAE | 250 | 3.13 | 122-solution clear |
| Ex. 12 | PAE | 100 | 1.25 | 146-solution clear |

The PAE resin depressed the talc more effectively than the UF resin and improved water clarity of the settled slurry.

Example IV

Treatment of Coal Tailings

The PAE resin was tested as a coagulant in a two-step process for clarifying water from coal tailings. The PAE resin was compared with poly-diallyldimethylammonium chloride (poly-DADMAC), a common depressant used to purify coal tailings. The coagulants were diluted to a 1 vol % solution by adding 1 mL of PAE resin solution to 99 mL of water. A flocculent (Magnafloc-336) was made at a 0.05% concentration by adding about 0.5 g to about 999.5 mL of water. About 1,000 mL of a 4 wt % solids thickener feed of clays and dirt from coal tailings was added to a 1,000 mL graduated cylinder. About 1 mL of the 1% coagulant solution was added to the coal tailings and the cylinder was shaken 3 times to distribute the coagulant. About 3 mL of the 0.05% flocculent solution was added to the cylinder and again the cylinder was shaken 3 times to distribute the material. The cylinder was placed on a bench top and the rate at which the solids settled was observed. The use of the PAE resin as a coagulant allowed the thickener feed to settle at a rate of about 8"/min. The head of the settled water was decanted into a clarity wedge to determine transparency, and the reading was half a wedge with a numerical value of 25. The measurement was conducted three times. PolyDADMAC was directly compared as a coagulant giving the same results.

Example V

Phosphate Flotation

Phosphate flotation tests were carried out using about 370 grams of a phosphate ore sample and about 863 ml water in a Denver mechanical flotation machine with a one liter stainless steel cell. The reagent conditioning and flotation slurry contained about 30 wt % solids and had a pH of about 9.2. The impeller rotation speed was about 1,100 rpm.

A dosage of about 3 kg/ton of tall oil fatty acid collector was added to the flotation slurry and a dosage of about 6 kg/ton of water glass (sodium silicate) was added to the flotation slurry. A PAE resin that had a solids concentration of about 25 wt % was compared to a UF resin (TALON® 6452 made by Georgia-Pacific Chemicals LLC) that had a solids concentration of about 45 wt % solids. The resin dosages tested were 0.05, 0.5, 0.1, and 0.25 kg/ton. Each reagent conditioning time was 2 minutes and the flotation time was 4 minutes. After the collector and depressants were added and the flotation slurry conditioned, air to the flotation cell was turned on to produce bubbles in the slurry to initiate the froth flotation process which lasted about 4 min. Flotation concentrate and tailings were collected, filtered, and dried before they were subjected to analysis for $P_2O_5$ and quartz contents. The phosphate flotation results are shown in Table 4.

TABLE 4

Phosphate Flotation Results

| Sample | Resin | Dosage (kg/t) | $P_2O_5$ Grade (%) | Recovery (%) |
| --- | --- | --- | --- | --- |
| C14 | None | 0 | 23.09 | 33.99 |
| C15 | UF Resin | 0.5 | 24.68 | 94.47 |
| Ex. 13 | PAE Resin | 0.05 | 26.18 | 95.31 |
| Ex. 14 | PAE Resin | 0.1 | 25.65 | 94.89 |
| Ex. 15 | PAE Resin | 0.25 | 25.53 | 92.3 |

The use of the PAE resin as a depressant in phosphate flotation greatly improved grade and recovery. Inclusion of PAE resin led to both higher $P_2O_5$ grade and recovery of phosphate. Only 12.5 g/t dry weight of resin was necessary for depression, confirming initial studies of montmorillonite depression which suggested exceptionally low quantities of PAE will depress gangue material in valuable ore.

Embodiments of the present disclosure further relate to any one or more of the following paragraphs:

1. A method for separating particulates from an aqueous suspension, comprising: mixing a polyamidoamine-epihalohydrin resin with an aqueous suspension comprising one or more first particulates to produce a treated mixture, wherein an amount of the polyamidoamine-epihalohydrin resin in the treated mixture is less than 500 g/tonne of the one or more first particulates; and recovering from the treated mixture a purified water having a reduced concentration of the one or more first particulates relative to the aqueous suspension, a purified first particulate product having a reduced concentration of water relative to the aqueous suspension, or both.

2. The method of claim 1, wherein the one or more first particulates comprise clay, a clay mineral, sand, a glass sand containing quartz, a silicate, quartz, a carbonate, a metal, a metal oxide, or any mixture thereof.

3. The method according to paragraph 2, wherein the silicate comprises a phyllosilicate, a tectosilicate, an orthosilicate, or any mixture thereof.

4. The method according to paragraph 2, wherein the clay comprises kaolinite, montmorillonite, illite, chlorite, or any mixture thereof.

5. The method according to paragraph 1, wherein the one or more first particulates comprise one or more clays, one or more phyllosilicates, one or more aluminosilicates, mica, quarts, or any mixture thereof.

6. The method according to paragraph 1, wherein the one or more first particulates comprise bentonite.

7. The method according to any one of paragraphs 1 to 6, wherein the aqueous suspension further comprises one or more second particulates, wherein the one or more second particulates comprise antimony, barium, bauxite, bismuth, borate, borax, calcium, chromium, coal, cobalt, copper, feldspar, gold, graphite, gypsum, iron, lead, magnesium, manganese, molybdenum, nickel, palladium, phosphates, phosphorus, platinum, potash, scandium, yttrium, lanthanum, cerium, praseodymium, neodymium, promethium, samarium, europium, gadolinium, terbium, dysprosium, holmium, erbium, thulium, ytterbium, lutetium, silver, magnesium silicate, sulfates, titanium, tungsten, uranium, zinc, oxides thereof, carbonates thereof, hydroxides thereof, or any mixture thereof, and wherein the one or more first particulates are different than the one or more second particulates.

8. The method according to paragraph 7, further comprising recovering a purified second particulate product having a reduced concentration of water and the one or more first particulates relative to the aqueous suspension.

9. The method according to any one of paragraphs 1 to 6, wherein the aqueous suspension further comprises one or more second particulates, wherein the one or more first particulates are different than the one or more second particulates, and wherein the one or more second particulates comprise a phosphorus ore.

10. The method according to paragraph 9, wherein the phosphorus ore comprises triphylite, monazite, hinsdalite, pyromorphite, vanadinite, erythrite, amblygonite, lazulite, wavellite, turquoise, autunite, carnotite, phosphophyllite, struvite, one or more apatites, one or more mitridatites, or any mixture thereof.

11. The method according to paragraph 9 or 10, further comprising recovering a purified second particulate product comprising the phosphorous ore having a reduced concentration of water and the one or more first particulates relative to the aqueous suspension.

12. The method according to any one of paragraphs 1 to 11, wherein the one or more first particulates comprise sand, clay, or a mixture thereof.

13. The method according to any one of paragraphs 1 to 12, wherein the amount of the polyamidoamine-epihalohydrin resin in the treated mixture is less than 300 g/tonne of the one or more first particulates.

14. The method according to any one of paragraphs 1 to 12, wherein the amount of the polyamidoamine-epihalohydrin resin in the treated mixture is less than 200 g/tonne of the one or more first particulates.

15. The method according to any one of paragraphs 1 to 12, wherein the amount of the polyamidoamine-epihalohydrin resin in the treated mixture is less than 100 g/tonne of the one or more first particulates.

16. The method according to any one of paragraphs 1 to 12, wherein the amount of the polyamidoamine-epihalohydrin resin in the treated mixture is less than 50 g/tonne of the one or more first particulates.

17. The method according to any one of paragraphs 1 to 12, wherein the amount of the polyamidoamine-epihalohydrin resin in the treated mixture is less than 20 g/tonne of the one or more first particulates.

18. The method according to any one of paragraphs 1 to 12, wherein the amount of the polyamidoamine-epihalohydrin resin in the treated mixture is about 0.001 g/tonne of the one or more first particulates to less than 300 g/tonne of the one or more first particulates.

19. The method according to any one of paragraphs 1 to 12, wherein the amount of the polyamidoamine-epihalohydrin resin in the treated mixture is about 0.001 g/tonne of the one or more first particulates to less than 200 g/tonne of the one or more first particulates.

20. The method according to any one of paragraphs 1 to 12, wherein the amount of the polyamidoamine-epihalohydrin resin in the treated mixture is about 0.001 g/tonne of the one or more first particulates to less than 100 g/tonne of the one or more first particulates.

21. The method according to any one of paragraphs 1 to 12, wherein the amount of the polyamidoamine-epihalohydrin resin in the treated mixture is about 0.001 g/tonne of the one or more first particulates to less than 50 g/tonne of the one or more first particulates.

22. The method according to any one of paragraphs 1 to 12, wherein the amount of the polyamidoamine-epihalohydrin resin in the treated mixture is about 0.001 g/tonne of the one or more first particulates to less than 25 g/tonne of the one or more first particulates.

23. The method according to any one of paragraphs 1 to 12, wherein the amount of the polyamidoamine-epihalohydrin resin in the treated mixture is about 0.001 g/tonne of the one or more first particulates to less than 15 g/tonne of the one or more first particulates.

24. The method according to any one of paragraphs 1 to 23, wherein the treated mixture comprises less than 10 wt % of any polysaccharide, based on a weight of the PAE resin in the treated mixture.

25. The method according to any one of paragraphs 1 to 23, wherein the treated mixture comprises less than 7 wt % of any polysaccharide, based on a weight of the PAE resin in the treated mixture.

26. The method according to any one of paragraphs 1 to 23, wherein the treated mixture comprises less than 5 wt % of any polysaccharide, based on a weight of the PAE resin in the treated mixture.

27. The method according to any one of paragraphs 1 to 23, wherein the treated mixture comprises less than 3 wt % of any polysaccharide, based on a weight of the PAE resin in the treated mixture.

28. The method according to any one of paragraphs 1 to 23, wherein the treated mixture comprises less than 2 wt % of any polysaccharide, based on a weight of the PAE resin in the treated mixture.

29. The method according to any one of paragraphs 1 to 23, wherein the treated mixture comprises less than 1 wt % of any polysaccharide, based on a weight of the PAE resin in the treated mixture.

30. The method according to any one of paragraphs 1 to 23, wherein the treated mixture comprises less than 0.7 wt % of any polysaccharide, based on a weight of the PAE resin in the treated mixture.

31. The method according to any one of paragraphs 1 to 23, wherein the treated mixture comprises less than 0.5 wt % of any polysaccharide, based on a weight of the PAE resin in the treated mixture.

32. The method according to any one of paragraphs 1 to 23, wherein the treated mixture comprises less than 0.1 wt % of any polysaccharide, based on a weight of the PAE resin in the treated mixture.

33. The method according to any one of paragraphs 1 to 23, wherein the treated mixture comprises less than 0.07 wt % of any polysaccharide, based on a weight of the PAE resin in the treated mixture.

34. The method according to any one of paragraphs 1 to 23, wherein the treated mixture comprises less than 0.05 wt % of any polysaccharide, based on a weight of the PAE resin in the treated mixture.

35. The method according to any one of paragraphs 1 to 23, wherein the treated mixture comprises less than 0.01 wt % of any polysaccharide, based on a weight of the PAE resin in the treated mixture.

36. The method according to any one of paragraphs 1 to 23, wherein the treated mixture comprises less than 0.005 wt % of any polysaccharide, based on a weight of the PAE resin in the treated mixture.

37. The method according to any one of paragraphs 1 to 23, wherein the treated mixture comprises less than 0.001 wt % of any polysaccharide, based on a weight of the PAE resin in the treated mixture.

38. The method according to any one of paragraphs 1 to 23, wherein the treated mixture is free of any polysaccharide.

39. The method according to any one of paragraphs 1 to 23, wherein the treated mixture is free of any intentionally added polysaccharide.

40. The method according to any one of paragraphs 1 to 39, wherein the polyamidoamine-epihalohydrin resin comprises a reaction product of about 0.56 moles to about 1.35 moles of a polyamidoamine and about 0.75 moles to about 1.8 moles of an epihalohydrin, and wherein the polyamidoamine comprises a reaction product of about 0.9 moles to about 1.1 moles of a polyamine and about 1.1 moles to about 0.9 moles of a dicarboxylic acid.

41. The method according to paragraph 40, wherein the epihalohydrin comprises epichlorohydrin, wherein the polyamine comprises diethylenetriamine, triethylenetetramine, tripropylenetetramine, tetraethylenepentamine, pentaethylenehexamine, or any mixture thereof, and wherein the dicarboxylic acid comprises malonic acid, succinic acid, glutaric acid, adipic acid, suberic acid, sebacic acid, or any mixture thereof.

42. The method according to any one of paragraphs 1 to 39, wherein the polyamidoamine-epihalohydrin resin comprises a reaction product of an epihalohydrin and a polyamidoamine, and wherein a molar ratio of the epihalohydrin to the polyamidoamine is about 0.75:1 to about 1.8:1.

43. The method according to any one of paragraphs 1 to 39, wherein the polyamidoamine-epihalohydrin resin comprises a reaction product of an epihalohydrin and a polyamidoamine, and wherein a molar ratio of the epihalohydrin to the polyamidoamine is about 1:1 to about 1.5:1.

44. The method according to any one of paragraphs 1 to 39, wherein the polyamidoamine-epihalohydrin resin comprises a reaction product of an epihalohydrin and a polyamidoamine, and wherein a molar ratio of the epihalohydrin to the polyamidoamine is about 1:2 to about 1.4:1.

45. The method according to any one of paragraphs 42 to 44, wherein the epihalohydrin comprises epichlorohydrin, wherein the polyamidoamine comprises a reaction product of a polyamine and a dicarboxylic acid, wherein the polyamine comprises diethylenetriamine, triethylenetetramine, tripropylenetetramine, tetraethylenepentamine, pentaethylenehexamine, or any mixture thereof, and wherein the dicarboxylic acid comprises malonic acid, succinic acid, glutaric acid, adipic acid, suberic acid, sebacic acid, or any mixture thereof.

46. The method according to any one of paragraphs 1 to 45, wherein the polyamidoamine-epihalohydrin resin has a weight average molecular weight of about 500,000 to about 1,300,000.

47. The method according to any one of paragraphs 1 to 45, wherein the polyamidoamine-epihalohydrin resin has a weight average molecular weight of about 700,000 to about 1,100,000.

48. The method according to any one of paragraphs 1 to 45, wherein the polyamidoamine-epihalohydrin resin has a weight average molecular weight of about 750,000 to about 950,000.

49. The method according to any one of paragraphs 1 to 48, wherein the polyamidoamine-epihalohydrin resin has a ratio of azetidinium ions to amide residues of about 0.5 to about 0.9.

50. The method according to any one of paragraphs 1 to 48, wherein the polyamidoamine-epihalohydrin resin has a ratio of azetidinium ions to amide residues of about 0.55 to about 0.8.

51. The method according to any one of paragraphs 1 to 48, wherein the polyamidoamine-epihalohydrin resin has a ratio of azetidinium ions to amide residues of about 0.6 to about 0.75.

52. The method according to any one of paragraphs 1 to 51, wherein the polyamidoamine-epihalohydrin resin has a charge density of about 1.5 mEq/gram of solids to about 3 mEq/gram of solids.

53. The method according to any one of paragraphs 1 to 51, wherein the polyamidoamine-epihalohydrin resin has a charge density of about 1.7 mEq/gram of solids to about 2.7 mEq/gram of solids.

54. The method according to any one of paragraphs 1 to 39, wherein: the polyamidoamine-epihalohydrin resin comprises a reaction product of about 0.56 moles to about 1.35 moles of a polyamidoamine and about 0.75 moles to about 1.8 moles of an epihalohydrin, the polyamidoamine comprises a reaction product of about 0.9 moles to about 1.1 moles of a polyamine and about 1.1 moles to about 0.9 moles of a dicarboxylic acid, the epihalohydrin comprises epichlorohydrin, the polyamine comprises diethylenetriamine, triethylenetetramine, tripropylenetetramine, tetraethylenepentamine, pentaethylenehexamine, or any mixture thereof, the dicarboxylic acid comprises malonic acid, succinic acid, glutaric acid, adipic acid, suberic acid, sebacic acid, or any mixture thereof, the polyamidoamine-epihalohydrin resin has a weight average molecular weight of about 700,000 to about 1,100,000, the polyamidoamine-epihalohydrin resin has a ratio of azetidinium ions to amide residues of about 0.55 to about 0.8, and the polyamidoamine-epihalohydrin resin has a charge density of about 1.5 mEq/gram of solids to about 3 mEq/gram of solids.

55. A method for separating particulates from an aqueous suspension, comprising: mixing a polyamidoamine-epihalohydrin resin with an aqueous suspension comprising one or more particulates to produce a treated mixture, wherein an amount of the polyamidoamine-epihalohydrin resin in the treated mixture is less than 500 g/tonne of the one or more particulates; and removing water from the treated mixture by drainage, filtration, sedimentation, mechanical compression, or any combination thereof to produce a purified water having a reduced concentration of the one or more particulates relative to the aqueous suspension.

56. The method according to paragraph 55, wherein the one or more particulates comprise sand, clay, or a mixture thereof.

57. The method according to paragraph 55, wherein the one or more particulates comprise clay, a clay mineral, sand, a glass sand containing quartz, a silicate, quartz, a carbonate, a metal, a metal oxide, or any mixture thereof.

58. The method according to paragraph 57, wherein the silicate comprises a phyllosilicate, a tectosilicate, an orthosilicate, or any mixture thereof.

59. The method according to paragraph 57, wherein the clay comprises kaolinite, montmorillonite, illite, chlorite, or any mixture thereof.

60. The method according to paragraph 55, wherein the one or more particulates comprise one or more clays, one or more phyllosilicates, one or more aluminosilicates, mica, quarts, or any mixture thereof.

61. The method according to paragraph 55, wherein the one or more particulates comprise bentonite.

62. The method according to any one of paragraphs 55 to 61, wherein the amount of the polyamidoamine-epihalohydrin resin in the treated mixture is less than 300 g/tonne of the one or more particulates.

63. The method according to any one of paragraphs 55 to 61, wherein the amount of the polyamidoamine-epihalohydrin resin in the treated mixture is less than 200 g/tonne of the one or more particulates.

64. The method according to any one of paragraphs 55 to 61, wherein the amount of the polyamidoamine-epihalohydrin resin in the treated mixture is less than 100 g/tonne of the one or more particulates.

65. The method according to any one of paragraphs 55 to 61, wherein the amount of the polyamidoamine-epihalohydrin resin in the treated mixture is less than 50 g/tonne of the one or more particulates.

66. The method according to any one of paragraphs 55 to 61, wherein the amount of the polyamidoamine-epihalohydrin resin in the treated mixture is less than 20 g/tonne of the one or more particulates.

67. The method according to any one of paragraphs 55 to 61, wherein the amount of the polyamidoamine-epihalohydrin resin in the treated mixture is about 0.001 g/tonne of the one or more particulates to less than 300 g/tonne of the one or more particulates.

68. The method according to any one of paragraphs 55 to 61, wherein the amount of the polyamidoamine-epihalohydrin resin in the treated mixture is about 0.001 g/tonne of the one or more particulates to less than 200 g/tonne of the one or more particulates.

69. The method according to any one of paragraphs 55 to 61, wherein the amount of the polyamidoamine-epihalohydrin resin in the treated mixture is about 0.001 g/tonne of the one or more particulates to less than 100 g/tonne of the one or more particulates.

70. The method according to any one of paragraphs 55 to 61, wherein the amount of the polyamidoamine-epihalohydrin resin in the treated mixture is about 0.001 g/tonne of the one or more particulates to less than 50 g/tonne of the one or more particulates.

71. The method according to any one of paragraphs 55 to 61, wherein the amount of the polyamidoamine-epihalohydrin resin in the treated mixture is about 0.001 g/tonne of the one or more particulates to less than 25 g/tonne of the one or more particulates.

72. The method according to any one of paragraphs 55 to 61, wherein the amount of the polyamidoamine-epihalohydrin resin in the treated mixture is about 0.001 g/tonne of the one or more particulates to less than 15 g/tonne of the one or more particulates.

73. The method according to any one of paragraphs 55 to 72, wherein the treated mixture comprises less than 10 wt % of any polysaccharide, based on a weight of the PAE resin in the treated mixture.

74. The method according to any one of paragraphs 55 to 72, wherein the treated mixture comprises less than 7 wt % of any polysaccharide, based on a weight of the PAE resin in the treated mixture.

75. The method according to any one of paragraphs 55 to 72, wherein the treated mixture comprises less than 5 wt % of any polysaccharide, based on a weight of the PAE resin in the treated mixture.

76. The method according to any one of paragraphs 55 to 72, wherein the treated mixture comprises less than 3 wt % of any polysaccharide, based on a weight of the PAE resin in the treated mixture.

77. The method according to any one of paragraphs 55 to 72, wherein the treated mixture comprises less than 2 wt % of any polysaccharide, based on a weight of the PAE resin in the treated mixture.

78. The method according to any one of paragraphs 55 to 72, wherein the treated mixture comprises less than 1 wt % of any polysaccharide, based on a weight of the PAE resin in the treated mixture.

79. The method according to any one of paragraphs 55 to 72, wherein the treated mixture comprises less than 0.7 wt % of any polysaccharide, based on a weight of the PAE resin in the treated mixture.

80. The method according to any one of paragraphs 55 to 72, wherein the treated mixture comprises less than 0.5 wt % of any polysaccharide, based on a weight of the PAE resin in the treated mixture.

81. The method according to any one of paragraphs 55 to 72, wherein the treated mixture comprises less than 0.1 wt % of any polysaccharide, based on a weight of the PAE resin in the treated mixture.

82. The method according to any one of paragraphs 55 to 72, wherein the treated mixture comprises less than 0.07 wt % of any polysaccharide, based on a weight of the PAE resin in the treated mixture.

83. The method according to any one of paragraphs 55 to 72, wherein the treated mixture comprises less than 0.05 wt % of any polysaccharide, based on a weight of the PAE resin in the treated mixture.

84. The method according to any one of paragraphs 55 to 72, wherein the treated mixture comprises less than 0.01 wt % of any polysaccharide, based on a weight of the PAE resin in the treated mixture.

85. The method according to any one of paragraphs 55 to 72, wherein the treated mixture comprises less than 0.005 wt % of any polysaccharide, based on a weight of the PAE resin in the treated mixture.

86. The method according to any one of paragraphs 55 to 72, wherein the treated mixture comprises less than 0.001 wt % of any polysaccharide, based on a weight of the PAE resin in the treated mixture.

87. The method according to any one of paragraphs 55 to 72, wherein the treated mixture is free of any polysaccharide.

88. The method according to any one of paragraphs 55 to 72, wherein the treated mixture is free of any intentionally added polysaccharide.

89. The according to any one of paragraphs 55 to 88, wherein the polyamidoamine-epihalohydrin resin comprises a reaction product of about 0.56 moles to about 1.35 moles of a polyamidoamine and about 0.75 moles to about 1.8 moles epihalohydrin, and wherein the polyamidoamine comprises a reaction product of about 0.9 moles to about 1.1 moles of a polyamine and about 1.1 moles to about 0.9 moles of a dicarboxylic acid.

90. The method according to paragraph 89, wherein the epihalohydrin comprises epichlorohydrin, wherein the polyamine comprises diethylenetriamine, triethylenetetramine, tripropylenetetramine, tetraethylenepentamine, pentaethylenehexamine, or any mixture thereof, and wherein the dicarboxylic acid comprises malonic acid, succinic acid, glutaric acid, adipic acid, suberic acid, sebacic acid, or any mixture thereof.

91. The method according to any one of paragraphs 55 to 90, wherein the polyamidoamine-epihalohydrin resin comprises a reaction product of an epihalohydrin and a polyamidoamine, and wherein a molar ratio of the epihalohydrin to the polyamidoamine is about 0.75:1 to about 1.8:1.

92. The method according to any one of paragraphs 55 to 90, wherein the polyamidoamine-epihalohydrin resin comprises a reaction product of an epihalohydrin and a polyamidoamine, and wherein a molar ratio of the epihalohydrin to the polyamidoamine is about 1:1 to about 1.5:1.

93. The method according to any one of paragraphs 55 to 90, wherein the polyamidoamine-epihalohydrin resin comprises a reaction product of an epihalohydrin and a polyamidoamine, and wherein a molar ratio of the epihalohydrin to the polyamidoamine is about 1:2 to about 1.4:1.

94. The method according to any one of paragraphs 91 to 93, wherein the epihalohydrin comprises epichlorohydrin, wherein the polyamidoamine comprises a reaction product of a polyamine and a dicarboxylic acid, wherein the polyamine comprises diethylenetriamine, triethylenetetramine, tripropylenetetramine, tetraethylenepentamine, pentaethylenehexamine, or any mixture thereof, and wherein the dicarboxylic acid comprises malonic acid, succinic acid, glutaric acid, adipic acid, suberic acid, sebacic acid, or any mixture thereof.

95. The method according to any one of paragraphs 55 to 94, wherein the polyamidoamine-epihalohydrin resin has a weight average molecular weight of about 500,000 to about 1,300,000.

96. The method according to any one of paragraphs 55 to 94, wherein the polyamidoamine-epihalohydrin resin has a weight average molecular weight of about 700,000 to about 1,100,000.

97. The method according to any one of paragraphs 55 to 94, wherein the polyamidoamine-epihalohydrin resin has a weight average molecular weight of about 750,000 to about 950,000.

98. The method according to any one of paragraphs 55 to 97, wherein the polyamidoamine-epihalohydrin resin has a ratio of azetidinium ions to amide residues of about 0.5 to about 0.9.

99. The method according to any one of paragraphs 55 to 97, wherein the polyamidoamine-epihalohydrin resin has a ratio of azetidinium ions to amide residues of about 0.55 to about 0.8.

100. The method according to any one of paragraphs 55 to 97, wherein the polyamidoamine-epihalohydrin resin has a ratio of azetidinium ions to amide residues of about 0.6 to about 0.75.

101. The method according to any one of paragraphs 55 to 100, wherein the polyamidoamine-epihalohydrin resin has a charge density of about 1.5 mEq/gram of solids to about 3 mEq/gram of solids.

102. The method according to any one of paragraphs 55 to 100, wherein the polyamidoamine-epihalohydrin resin has a charge density of about 1.7 mEq/gram of solids to about 2.7 mEq/gram of solids.

103. A method for separating particulates from an aqueous suspension, comprising: dispersing a polyamidoamine-epihalohydrin resin in an aqueous suspension comprising one or more first particulates and one or more second particulates to produce a treated mixture, wherein an amount of the polyamidoamine-epihalohydrin resin in the treated mixture is less than 500 g/tonne of the one or more first particulates and the one or more second particulates; passing air through the treated mixture to produce a relatively hydrophobic fraction and a relatively hydrophilic fraction; and collecting a purified product comprising the one or more first particulates having a reduced concentration of the one or more second particulates relative to the aqueous slurry from either fraction.

104. The method according to paragraph 103, wherein the one or more first particulates comprise clay, a clay mineral, sand, a glass sand containing quartz, a silicate, quartz, a carbonates, a metal, a metal oxide, or any mixture thereof, wherein the one or more second particulates comprise antimony, barium, bauxite, bismuth, borate, borax, calcium, chromium, coal, cobalt, copper, feldspar, gold, graphite, gypsum, iron, lead, magnesium, manganese, molybdenum, nickel, palladium, phosphates, phosphorus, platinum, potash, scandium, yttrium, lanthanum, cerium, praseodymium, neodymium, promethium, samarium, europium, gadolinium, terbium, dysprosium, holmium, erbium, thulium, ytterbium, lutetium, silver, magnesium silicate, sulfates, titanium, tungsten, uranium, zinc, oxides thereof, carbonates thereof, hydroxides thereof, or any mixture thereof, and wherein the one or more first particulates are different than the one or more second particulates.

105. The method according to paragraph 103 or 104, wherein the one or more first particulates comprise clay, sand, or a mixture thereof.

106. The method according to paragraph 103, wherein the silicate comprises a phyllosilicate, a tectosilicate, an orthosilicate, or any mixture thereof.

107. The method according to paragraph 104 or 105, wherein the clay comprises kaolinite, montmorillonite, illite, chlorite, or any mixture thereof.

108. The method according to paragraph 103, wherein the one or more first particulates comprise one or more clays, one or more phyllosilicates, one or more aluminosilicates, mica, quartz, or any mixture thereof.

109. The method according to paragraph 103 or 104, wherein the one or more first particulates comprise bentonite.

110. The method according to any one of paragraphs 103 to 109, wherein the one or more second particulates comprise a phosphorus ore.

111. The method according to paragraph 110, wherein the phosphorus ore comprises triphylite, monazite, hinsdalite, pyromorphite, vanadinite, erythrite, amblygonite, lazulite, wavellite, turquoise, autunite, carnotite, phosphophyllite, struvite, one or more apatites, one or more mitridatites, or any mixture thereof.

112. The method according to paragraph 110 or 111, further comprising recovering a purified second particulate product comprising the phosphorous ore having a reduced concentration of water and the one or more first particulates relative to the aqueous suspension.

113. The method according to any one of paragraphs 103 to 112, wherein the amount of the polyamidoamine-epihalohydrin resin in the treated mixture is less than 300 g/tonne of the one or more first particulates.

114. The method according to any one of paragraphs 103 to 112, wherein the amount of the polyamidoamine-epihalohydrin resin in the treated mixture is less than 20 g/tonne of the one or more first particulates.

115. The method according to any one of paragraphs 103 to 112, wherein the amount of the polyamidoamine-epihalohydrin resin in the treated mixture is about 0.001 g/tonne of the one or more first particulates to less than 300 g/tonne of the one or more first particulates.

116. The method according to any one of paragraphs 103 to 115, wherein the treated mixture comprises less than 10 wt % of any polysaccharide, based on a weight of the PAE resin in the treated mixture.

117. The method according to any one of paragraphs 103 to 115, wherein the treated mixture comprises less than 1 wt % of any polysaccharide, based on a weight of the PAE resin in the treated mixture.

118. The method according to any one of paragraphs 103 to 115, wherein the treated mixture comprises less than 0.1 wt % of any polysaccharide, based on a weight of the PAE resin in the treated mixture.

119. The method according to any one of paragraphs 103 to 115, wherein the treated mixture comprises less than 0.01 wt % of any polysaccharide, based on a weight of the PAE resin in the treated mixture.

120. The method according to any one of paragraphs 103 to 115, wherein the treated mixture comprises less than 0.001 wt % of any polysaccharide, based on a weight of the PAE resin in the treated mixture.

121. The method according to any one of paragraphs 103 to 115, wherein the treated mixture is free of any polysaccharide.

122. The method according to any one of paragraphs 103 to 115, wherein the treated mixture is free of any intentionally added polysaccharide.

123. The method according to any one of paragraphs 103 to 122, wherein the polyamidoamine-epihalohydrin resin comprises a reaction product of about 0.56 moles to about 1.35 moles of a polyamidoamine and about 0.75 moles to about 1.8 moles of an epihalohydrin, and wherein the polyamidoamine comprises a reaction product of about 0.9 moles to about 1.1 moles of a polyamine and about 1.1 moles to about 0.9 moles of a dicarboxylic acid.

124. The method according to paragraph 123, wherein the epihalohydrin comprises epichlorohydrin, wherein the polyamine comprises diethylenetriamine, triethylenetetramine, tripropylenetetramine, tetraethylenepentamine, pentaethylenehexamine, or any mixture thereof, and wherein the dicarboxylic acid comprises malonic acid, succinic acid, glutaric acid, adipic acid, suberic acid, sebacic acid, or any mixture thereof.

125. The method according to any one of paragraphs 103 to 122, wherein the polyamidoamine-epihalohydrin resin comprises a reaction product of an epihalohydrin and a polyamidoamine, and wherein a molar ratio of the epihalohydrin to the polyamidoamine is about 0.75:1 to about 1.8:1.

126. The method according to any one of paragraphs 103 to 122, wherein the polyamidoamine-epihalohydrin resin comprises a reaction product of an epihalohydrin and a polyamidoamine, and wherein a molar ratio of the epihalohydrin to the polyamidoamine is about 1:1 to about 1.5:1.

127. The method according to any one of paragraphs 103 to 122, wherein the polyamidoamine-epihalohydrin resin comprises a reaction product of an epihalohydrin and a polyamidoamine, and wherein a molar ratio of the epihalohydrin to the polyamidoamine is about 1:2 to about 1.4:1.

128. The method according to any one of paragraphs 125 to 127, wherein the epihalohydrin comprises epichlorohydrin, wherein the polyamidoamine comprises a reaction product of a polyamine and a dicarboxylic acid, wherein the polyamine comprises diethylenetriamine, triethylenetetramine, tripropylenetetramine, tetraethylenepentamine, pentaethylenehexamine, or any mixture thereof, and wherein the dicarboxylic acid comprises malonic acid, succinic acid, glutaric acid, adipic acid, suberic acid, sebacic acid, or any mixture thereof.

129. The method according to any one of paragraphs 103 to 128, wherein the polyamidoamine-epihalohydrin resin has a weight average molecular weight of about 500,000 to about 1,300,000.

130. The method according to any one of paragraphs 103 to 128, wherein the polyamidoamine-epihalohydrin resin has a weight average molecular weight of about 700,000 to about 1,100,000.

131. The method according to any one of paragraphs 103 to 128, wherein the polyamidoamine-epihalohydrin resin has a weight average molecular weight of about 750,000 to about 950,000.

132. The method according to any one of paragraphs 103 to 131, wherein the polyamidoamine-epihalohydrin resin has a ratio of azetidinium ions to amide residues of about 0.5 to about 0.9.

133. The method according to any one of paragraphs 103 to 131, wherein the polyamidoamine-epihalohydrin resin has a ratio of azetidinium ions to amide residues of about 0.55 to about 0.8.

134. The method according to any one of paragraphs 103 to 131, wherein the polyamidoamine-epihalohydrin resin has a ratio of azetidinium ions to amide residues of about 0.6 to about 0.75.

135. The method according to any one of paragraphs 103 to 134, wherein the polyamidoamine-epihalohydrin resin has a charge density of about 1.5 mEq/gram of solids to about 3 mEq/gram of solids.

136. The method according to any one of paragraphs 103 to 134, wherein the polyamidoamine-epihalohydrin resin has a charge density of about 1.7 mEq/gram of solids to about 2.7 mEq/gram of solids.

137. An aqueous suspension comprising: a polyamidoamine-epihalohydrin resin, one or more first particulates and water, wherein an amount of the polyamidoamine-epihalohydrin resin in the treated mixture is less than 500 g/tonne of the one or more first particulates.

138. The aqueous suspension according to paragraph 148, further comprising one or more second particulates, wherein the one or more first particulates are different than the one or more second particulates.

139. The aqueous suspension according to paragraph 138, wherein the one or more first particulates comprise clay, a clay mineral, sand, a glass sand containing quartz, a silicate, quartz, a carbonates, a metal, a metal oxide, or any mixture thereof, wherein the one or more second particulates comprise antimony, barium, bauxite, bismuth, borate, borax, calcium, chromium, coal, cobalt, copper, feldspar, gold, graphite, gypsum, iron, lead, magnesium, manganese, molybdenum, nickel, palladium, phosphates, phosphorus, platinum, potash, scandium, yttrium, lanthanum, cerium, praseodymium, neodymium, promethium, samarium, europium, gadolinium, terbium, dysprosium, holmium, erbium, thulium, ytterbium, lutetium, silver, magnesium silicate, sulfates, titanium, tungsten, uranium, zinc, oxides thereof, carbonates thereof, hydroxides thereof, or any mixture thereof, and wherein the one or more first particulates are different than the one or more second particulates.

140. The aqueous suspension according to any one of paragraphs 137 to 139, wherein the one or more first particulates comprise clay, sand, or a mixture thereof.

141. The aqueous suspension according to paragraph 140, wherein the silicate comprises a phyllosilicate, a tectosilicate, an orthosilicate, or any mixture thereof.

142. The aqueous suspension according to paragraph 140, wherein the clay comprises kaolinite, montmorillonite, illite, chlorite, or any mixture thereof.

143. The aqueous suspension according to any one of paragraphs 137 to 139, wherein the one or more first particulates comprise one or more clays, one or more phyllosilicates, one or more aluminosilicates, mica, quartz, or any mixture thereof.

144. The aqueous suspension according to paragraph 137 or 138, wherein the one or more first particulates comprise bentonite.

145. The aqueous suspension according to any one of paragraphs 137 to 139, wherein the one or more second particulates comprise a phosphorus ore.

146. The aqueous suspension according to paragraph 145, wherein the phosphorus ore comprises triphylite, monazite, hinsdalite, pyromorphite, vanadinite, erythrite, amblygonite, lazulite, wavellite, turquoise, autunite, carnotite, phosphophyllite, struvite, one or more apatites, one or more mitridatites, or any mixture thereof.

147. The aqueous suspension according to any one of paragraphs 137 to 146, wherein the amount of the polyamidoamine-epihalohydrin resin in the treated mixture is less than 300 g/tonne of the one or more first particulates.

148. The aqueous suspension according to any one of paragraphs 137 to 146, wherein the amount of the polyamidoamine-epihalohydrin resin in the treated mixture is less than 20 g/tonne of the one or more first particulates.

149. The aqueous suspension according to any one of paragraphs 137 to 146, wherein the amount of the polyamidoamine-epihalohydrin resin in the treated mixture is about 0.001 g/tonne of the one or more first particulates to less than 300 g/tonne of the one or more first particulates.

150. The aqueous suspension according to any one of paragraphs 137 to 149, wherein the treated mixture comprises less than 10 wt % of any polysaccharide, based on a weight of the PAE resin in the treated mixture.

151. The aqueous suspension according to any one of paragraphs 137 to 150, wherein the treated mixture comprises less than 1 wt % of any polysaccharide, based on a weight of the PAE resin in the treated mixture.

152. The aqueous suspension according to any one of paragraphs 137 to 150, wherein the treated mixture comprises less than 0.1 wt % of any polysaccharide, based on a weight of the PAE resin in the treated mixture.

153. The aqueous suspension according to any one of paragraphs 137 to 150, wherein the treated mixture comprises less than 0.01 wt % of any polysaccharide, based on a weight of the PAE resin in the treated mixture.

154. The aqueous suspension according to any one of paragraphs 137 to 150, wherein the treated mixture comprises less than 0.001 wt % of any polysaccharide, based on a weight of the PAE resin in the treated mixture.

155. The aqueous suspension according to any one of paragraphs 137 to 150, wherein the treated mixture is free of any polysaccharide.

156. The aqueous suspension according to any one of paragraphs 137 to 150, wherein the treated mixture is free of any intentionally added polysaccharide.

157. The aqueous suspension according to any one of paragraphs 137 to 156, wherein the polyamidoamine-epihalohydrin resin comprises a reaction product of about 0.56 moles to about 1.35 moles of a polyamidoamine and about 0.75 moles to about 1.8 moles of an epihalohydrin, and wherein the polyamidoamine comprises a reaction product of about 0.9 moles to about 1.1 moles of a polyamine and about 1.1 moles to about 0.9 moles of a dicarboxylic acid.

158. The aqueous suspension according to paragraph 157, wherein the epihalohydrin comprises epichlorohydrin, wherein the polyamine comprises diethylenetriamine, triethylenetetramine, tripropylenetetramine, tetraethylenepentamine, pentaethylenehexamine, or any mixture thereof, and wherein the dicarboxylic acid comprises malonic acid, succinic acid, glutaric acid, adipic acid, suberic acid, sebacic acid, or any mixture thereof.

159. The aqueous suspension according to any one of paragraphs 137 to 156, wherein the polyamidoamine-epihalohydrin resin comprises a reaction product of an epihalohydrin and a polyamidoamine, and wherein a molar ratio of the epihalohydrin to the polyamidoamine is about 0.75:1 to about 1.8:1.

160. The aqueous suspension according to any one of paragraphs 137 to 156, wherein the polyamidoamine-epihalohydrin resin comprises a reaction product of an epihalohydrin and a polyamidoamine, and wherein a molar ratio of the epihalohydrin to the polyamidoamine is about 1:1 to about 1.5:1.

161. The aqueous suspension according to any one of paragraphs 137 to 156, wherein the polyamidoamine-epihalohydrin resin comprises a reaction product of an epihalohydrin and a polyamidoamine, and wherein a molar ratio of the epihalohydrin to the polyamidoamine is about 1:2 to about 1.4:1.

162. The aqueous suspension according to any one of paragraphs 159 to 161, wherein the epihalohydrin comprises epichlorohydrin, wherein the polyamidoamine comprises a reaction product of a polyamine and a dicarboxylic acid, wherein the polyamine comprises diethylenetriamine, triethylenetetramine, tripropylenetetramine, tetraethylenepentamine, pentaethylenehexamine, or any mixture thereof, and wherein the dicarboxylic acid comprises malonic acid, succinic acid, glutaric acid, adipic acid, suberic acid, sebacic acid, or any mixture thereof.

163. The aqueous suspension according to any one of paragraphs 137 to 162, wherein the polyamidoamine-epihalohydrin resin has a weight average molecular weight of about 500,000 to about 1,300,000.

164. The aqueous suspension according to any one of paragraphs 137 to 162, wherein the polyamidoamine-epihalohydrin resin has a weight average molecular weight of about 700,000 to about 1,100,000.

165. The aqueous suspension according to any one of paragraphs 137 to 162, wherein the polyamidoamine-epihalohydrin resin has a weight average molecular weight of about 750,000 to about 950,000.

166. The aqueous suspension according to any one of paragraphs 137 to 165, wherein the polyamidoamine-epihalohydrin resin has a ratio of azetidinium ions to amide residues of about 0.5 to about 0.9.

167. The aqueous suspension according to any one of paragraphs 137 to 165, wherein the polyamidoamine-epihalohydrin resin has a ratio of azetidinium ions to amide residues of about 0.55 to about 0.8.

168. The aqueous suspension according to any one of paragraphs 137 to 165, wherein the polyamidoamine-epihalohydrin resin has a ratio of azetidinium ions to amide residues of about 0.6 to about 0.75.

169. The aqueous suspension according to any one of paragraphs 137 to 168, wherein the polyamidoamine-epihalohydrin resin has a charge density of about 1.5 mEq/gram of solids to about 3 mEq/gram of solids.

170. The aqueous suspension according to any one of paragraphs 137 to 168, wherein the polyamidoamine-epihalohydrin resin has a charge density of about 1.7 mEq/gram of solids to about 2.7 mEq/gram of solids.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments, other and further embodiments of the invention can be devised without departing from the basic scope thereof, and the scope thereof is determined by the claims that follow.

What is claimed is:

1. A method for separating particulates from an aqueous suspension, comprising:
   mixing a polyamidoamine-epihalohydrin resin with an aqueous suspension comprising one or more first particulates to produce a treated mixture, wherein an amount of the polyamidoamine-epihalohydrin resin in the treated mixture is less than 500 g/tonne of the one or more first particulates, and wherein the treated mixture comprises less than 0.5 wt % of any polysaccharide, based on a weight of the polyamidoamine-epihalohydrin resin in the treated mixture; and
   recovering from the treated mixture a purified water having a reduced concentration of the one or more first particulates relative to the aqueous suspension, a purified first particulate product having a reduced concentration of water relative to the aqueous suspension, or both.

2. The method of claim 1, wherein the one or more first particulates comprise clay, a clay mineral, sand, a glass sand containing quartz, a silicate, quartz, a carbonate, a metal, a metal oxide, or any mixture thereof.

3. The method of claim 1, wherein the aqueous suspension further comprises one or more second particulates, wherein the one or more second particulates comprise antimony, barium, bauxite, bismuth, borate, borax, calcium, chromium, coal, cobalt, copper, feldspar, gold, graphite, gypsum, iron, lead, magnesium, manganese, molybdenum, nickel, palladium, phosphates, phosphorus, platinum, potash, scandium, yttrium, lanthanum, cerium, praseodymium, neodymium, promethium, samarium, europium, gadolinium, terbium, dysprosium, holmium, erbium, thulium, ytterbium, lutetium, silver, magnesium silicate, sulfates, titanium, tungsten, uranium, zinc, oxides thereof, carbonates thereof, hydroxides thereof, or any mixture thereof, wherein the one or more first particulates are different than the one or more second particulates, and wherein the method further comprises recovering a purified second particulate product having a reduced concentration of water and the one or more first particulates relative to the aqueous suspension.

4. The method of claim 1, wherein the aqueous suspension further comprises one or more second particulates, wherein the one or more first particulates are different than the one or more second particulates, wherein the one or more second particulates comprise a phosphorus ore, wherein the phosphorus ore comprises triphylite, monazite, hinsdalite, pyromorphite, vanadinite, erythrite, amblygonite, lazulite, wavellite, turquoise, autunite, carnotite, phosphophyllite, struvite, one or more apatites, one or more mitridatites, or any mixture thereof, and wherein the method further comprises recovering a purified second particulate product comprising the phosphorus ore having a reduced concentration of water and the one or more first particulates relative to the aqueous suspension.

5. The method of claim 1, wherein the one or more first particulates comprise sand, clay, or a mixture thereof.

6. The method of claim 1, wherein the amount of the polyamidoamine-epihalohydrin resin in the treated mixture is about 0.001 g/tonne of the one or more first particulates to less than 300 g/tonne of the one or more first particulates.

7. The method of claim 1, wherein the polyamidoamine-epihalohydrin resin comprises a reaction product of about 0.56 moles to about 1.35 moles of a polyamidoamine and about 0.75 moles to about 1.8 moles of an epihalohydrin, and wherein the polyamidoamine is a reaction product of about 0.9 moles to about 1.1 moles of a polyamine and about 1.1 moles to about 0.9 moles of a dicarboxylic acid.

8. The method of claim 7, wherein the epihalohydrin comprises epichlorohydrin, wherein the polyamine comprises diethylenetriamine, triethylenetetramine, tripropylenetetramine, tetraethylenepentamine, pentaethylenehexamine, or any mixture thereof, and wherein the dicarboxylic acid comprises malonic acid, succinic acid, glutaric acid, adipic acid, suberic acid, sebacic acid, or any mixture thereof.

9. The method of claim 1, wherein the polyamidoamine-epihalohydrin resin has a weight average molecular weight of about 500,000 to about 1,300,000.

10. The method of claim 1, wherein the polyamidoamine-epihalohydrin resin has a ratio of azetidinium ions to amide residues of about 0.5 to about 0.9.

11. The method of claim 1, wherein the polyamidoamine-epihalohydrin resin has a charge density of about 1.5 mEq/gram of solids to about 3 mEq/gram of solids.

12. The method of claim 1, wherein:
   the polyamidoamine-epihalohydrin resin comprises a reaction product of about 0.56 moles to about 1.35 moles of a polyamidoamine and about 0.75 moles to about 1.8 moles of an epihalohydrin,
   the polyamidoamine comprises a reaction product of about 0.9 moles to about 1.1 moles of a polyamine and about 1.1 moles to about 0.9 moles of a dicarboxylic acid,
   the epihalohydrin comprises epichlorohydrin,
   the polyamine comprises diethylenetriamine, triethylenetetramine, tripropylenetetramine, tetraethylenepentamine, pentaethylenehexamine, or any mixture thereof,
   the dicarboxylic acid comprises malonic acid, succinic acid, glutaric acid, adipic acid, suberic acid, sebacic acid, or any mixture thereof,
   the polyamidoamine-epihalohydrin resin has a weight average molecular weight of about 700,000 to about 1,100,000,
   the polyamidoamine-epihalohydrin resin has a ratio of azetidinium ions to amide residues of about 0.55 to about 0.8, and
   the polyamidoamine-epihalohydrin resin has a charge density of about 1.5 mEq/gram of solids to about 3 mEq/gram of solids.

13. A method for separating particulates from an aqueous suspension, comprising:
   mixing a polyamidoamine-epihalohydrin resin with an aqueous suspension comprising one or more particulates to produce a treated mixture, wherein an amount of the polyamidoamine-epihalohydrin resin in the treated mixture is less than 500 g/tonne of the one or more particulates, and wherein the treated mixture comprises less than 0.5 wt % of any polysaccharide, based on a weight of the polyamidoamine-epihalohydrin resin in the treated mixture; and
   removing water from the treated mixture by drainage, filtration, sedimentation, mechanical compression, or any combination thereof to produce a purified water having a reduced concentration of the one or more particulates relative to the aqueous suspension.

14. The method of claim 13, wherein the one or more particulates comprise sand, clay, or a mixture thereof.

15. The method of claim 13, wherein the polyamidoamine-epihalohydrin resin comprises a reaction product of about 0.56 moles to about 1.35 moles of a polyamidoamine and about 0.75 moles to about 1.8 moles epihalohydrin, and wherein the polyamidoamine comprises a reaction product of about 0.9 moles to about 1.1 moles of a polyamine and about 1.1 moles to about 0.9 moles of a dicarboxylic acid.

16. The method of claim 13, wherein the polyamidoamine-epihalohydrin resin has weight average molecular weight of about 750,000 to about 950,000.

17. A method for separating particulates from an aqueous suspension, comprising:
dispersing a polyamidoamine-epihalohydrin resin in an aqueous suspension comprising one or more first particulates and one or more second particulates to produce a treated mixture, wherein an amount of the polyamidoamine-epihalohydrin resin in the treated mixture is less than 500 g/tonne of the one or more first particulates and the one or more second particulates, and wherein the treated mixture comprises less than 0.5 wt % of any polysaccharide, based on a weight of the polyamidoamine-epihalohydrin resin in the treated mixture;
passing air through the treated mixture to produce a hydrophobic fraction and a hydrophilic fraction; and
collecting a purified product comprising the one or more first particulates having a reduced concentration of the one or more second particulates relative to the aqueous suspension from the hydrophobic fraction or the hydrophilic fraction.

18. The method of claim 17, wherein the one or more first particulates comprise clay, a clay mineral, sand, a glass sand containing quartz, a silicates, quartz, a carbonates, a metal, a metal oxide, or any mixture thereof, wherein the one or more second particulates comprise antimony, barium, bauxite, bismuth, borate, borax, calcium, chromium, coal, cobalt, copper, feldspar, gold, graphite, gypsum, iron, lead, magnesium, manganese, molybdenum, nickel, palladium, phosphates, phosphorus, platinum, potash, scandium, yttrium, lanthanum, cerium, praseodymium, neodymium, promethium, samarium, europium, gadolinium, terbium, dysprosium, holmium, erbium, thulium, ytterbium, lutetium, silver, magnesium silicate, sulfates, titanium, tungsten, uranium, zinc, oxides thereof, carbonates thereof, hydroxides thereof, or any mixture thereof, and wherein the one or more first particulates are different than the one or more second particulates.

19. The method of claim 18, wherein the polyamidoamine-epihalohydrin resin has a weight average molecular weight of about 500,000 to about 1,300,000.

20. The method of claim 19, wherein the amount of the polyamidoamine-epihalohydrin resin in the treated mixture is about 0.001 g/tonne of the one or more first particulates to less than 300 g/tonne of the one or more first particulates.

* * * * *